US010605889B2

(12) United States Patent
Ylamurto et al.

(10) Patent No.: US 10,605,889 B2
(45) Date of Patent: Mar. 31, 2020

(54) SYSTEMS AND METHODS FOR PRECISE RADIO FREQUENCY LOCALIZATION USING TIME SWEEP TIME DIFFERENCE OF ARRIVAL

(71) Applicant: Locix, Inc., San Bruno, CA (US)

(72) Inventors: Tommi Ylamurto, Los Gatos, CA (US); Manu Seth, Berkeley, CA (US); Lingkai Kong, Palo Alto, CA (US); Sourav Dey, South San Francisco, CA (US); Demba Ba, San Bruno, CA (US)

(73) Assignee: Locix, Inc., San Bruno, CA (US)

( * ) Notice: Subject to any disclaimer, the term of this patent is extended or adjusted under 35 U.S.C. 154(b) by 0 days.

(21) Appl. No.: 16/283,780

(22) Filed: Feb. 24, 2019

(65) Prior Publication Data
US 2019/0187236 A1  Jun. 20, 2019

Related U.S. Application Data

(63) Continuation-in-part of application No. 15/684,893, filed on Aug. 23, 2017.

(51) Int. Cl.
*G01S 5/02* (2010.01)
*G01S 13/76* (2006.01)
*G01S 13/87* (2006.01)

(52) U.S. Cl.
CPC ............ *G01S 5/021* (2013.01); *G01S 5/0278* (2013.01); *G01S 5/0289* (2013.01); *G01S 13/765* (2013.01); *G01S 13/878* (2013.01)

(58) Field of Classification Search
CPC ........... H04W 4/33; H04W 4/80; H04W 4/02; H04W 4/025; H04W 40/244;
(Continued)

(56) References Cited

U.S. PATENT DOCUMENTS 7,764,231 B1 * 7/2010 Karr ................... G01S 1/026
342/457
9,304,186 B2   4/2016 Amizur
(Continued)

FOREIGN PATENT DOCUMENTS

WO    2015-099925 A1    7/2015
WO    2015-134270 A1    9/2015
(Continued)

OTHER PUBLICATIONS

Xu, Yurong et al., "Mobile Anchor-free Localization for Wireless Sensor Networks", Computer Science Department, Dartmouth College, Department of Computer Science and Engineering, University of Texas Arlington, 13 pages.
(Continued)

*Primary Examiner* — Ernest G Tacsik
(74) *Attorney, Agent, or Firm* — Jaffery Watson Mendonsa & Hamilton LLP

(57) ABSTRACT

Systems and apparatuses for determining locations of wireless nodes in a network architecture are disclosed herein. In one example, an asynchronous system includes first and second wireless nodes each having a wireless device with one or more processing units and RF circuitry for transmitting and receiving communications in the wireless network architecture. The system also includes a third wireless node having an unknown location and a wireless device with a transmitter and a receiver to enable communications with the first and second wireless nodes in the wireless network architecture. The one or more processing units of the first wireless node are configured to transmit instructions to a cloud based entity or execute instructions to determine a location coordinate hypothesis and a transmit time hypothesis for a transmitted communication of the third wireless node, determine an error function associated with the transmit time hypothesis for each received path j of the receiving
(Continued)

first and second wireless nodes at the location coordinate hypothesis, and determine a probability function of the error function for each received path j of the first and second wireless nodes using statistical properties of path measurement accuracy.

32 Claims, 18 Drawing Sheets

(58) Field of Classification Search
CPC ............. H04B 17/318; G06K 7/10722; G06K 7/1413; H04L 67/12; H04L 67/18; H04L 61/6022
See application file for complete search history.

(56) References Cited

U.S. PATENT DOCUMENTS

| | | |
|---|---|---|
| 2005/0271057 A1 | 12/2005 | Kim et al. |
| 2008/0090588 A1 | 4/2008 | Mizugaki et al. |
| 2008/0146262 A1 | 6/2008 | Schwoerer et al. |
| 2008/0186231 A1 | 8/2008 | Aljadeff et al. |
| 2008/0231494 A1 | 9/2008 | Galati |
| 2009/0073031 A1 | 3/2009 | Kim |
| 2009/0131075 A1 | 5/2009 | Mazlum et al. |
| 2013/0273935 A1 | 10/2013 | Amizur |
| 2014/0016485 A1* | 1/2014 | Curticapean ............ G01S 5/12 370/252 |
| 2014/0295877 A1 | 10/2014 | Hart |
| 2015/0063138 A1 | 3/2015 | Aldana |
| 2015/0168536 A1 | 6/2015 | Banin |
| 2015/0168537 A1 | 6/2015 | Amizur et al. |
| 2015/0215884 A1 | 7/2015 | Horvat et al. |
| 2016/0097837 A1* | 4/2016 | Richley .................... G01S 5/02 342/465 |
| 2016/0204822 A1 | 7/2016 | Yu et al. |
| 2016/0259032 A1* | 9/2016 | Hehn ................... G01S 5/0289 |
| 2017/0048671 A1 | 2/2017 | Marri Sridhar |
| 2017/0168135 A1 | 6/2017 | Want et al. |
| 2019/0020425 A1* | 1/2019 | Zhang ................. H04B 17/309 |
| 2019/0076698 A1* | 3/2019 | Yang .......................... G01S 5/14 |

FOREIGN PATENT DOCUMENTS

| | | |
|---|---|---|
| WO | 2017210359 A1 | 5/2017 |
| WO | 2019051040 A2 | 9/2018 |
| WO | 2019040558 A1 | 2/2019 |

OTHER PUBLICATIONS

Wang, Yue, "Linear least squares localization in sensor networks", EURASIP Journal on Wireless Communications and Networking, 7 pages, (2015).
Shang, Yi et al., "Improved MDS-Based Localization", IEEE INFOCOM 2004, 12 pages.
Chan, Y.T. et al., "A Simple and Efficient Estimator for Hyperbolic Location", IEEE Transactions on Signal Processing, vol. 42, No. 8, Aug. 1994, pp. 1905-1915.
Simonetto, Andrea et al., "Distributed Maximum Likelihood Sensor Network Localization", IEEE Transactions on Signals Processing, vol. 62, No. 6, Mar. 15, 2014, pp. 1424-1437.
Isokawa, Teijiro et al., "An Anchor-Free Localization Scheme with Kalman Filtering in ZigBee Sensor Network", Hindawa, ISRN Sensor Networks, vol. 2013, Article ID 356231, 11 pages, http:dx.doi.org/10.1155/2013/356231.
Priyantha, Nissanka B., et al., "Anchor-Free Distributed Localization in Sensor Networks", Tech Report #892, Apr. 15, 2003, MIT Laboratory for Computer Science, 13 pages, http://nms.lcs.mit.edu/cricket/.
Youssef, Adel et al., "Accurate Anchor-free Node Localization in Wireless Sensor Networks", Baltimore, Maryland, 14 pages.
Giustiniano, Domenico et al., CAESAR: Carrier Sense-Based Ranging in Off-The-Shelf 802.11 Wireless LAN, Disney Research Zurich, Switzerland, 12 pages.
Vasisht, Deepak, et al., "Decimeter-Level Localization with a Single WiFi Access Point", USENIX, The Advanced Computing Systems Associations, https://www.usenix.org/conference/nsdi16/technical-sessions/presentation/vasisht, Mar. 16-18, 2016, 15 pages.
Wibowo, Sigit et al., "Time of Flight Ranging using Off-the-shelf IEEE802.11 WiFi Tags", Centre for Adaptive Wireless Systems, Department of Electronic Engineering, Cork Institute of Technology, Bishoptown, Cork, Ireland, 5 pages.
Xie, Yaxiong et al., "Precise Power Delay Profiling with Commodity WiFi", School of Computer Engineering, Nanyan Technological University, Singapore, 12 pages, 2015.
Mariakakis, Alex et al., "SAIL: Single Access Point-Based Indoor Localization", 14 pages, 2014.
Kotaru, Manikanta et al., "SpotFi: Decimeter Level Localization Using WiFi", Stanford University, pp. 269-282, 2015.
Vasisht, Deepak et al., "Sub-Nanosecond Time of Flight on Commercial Wi-Fi Cards", Massachusetts Institute of Technology, 14 pages, 2015.
Sarkar Tapan K. et al., "Using the Matrix Pencil Method to Estimate the Parameters of a Sum of Complex Exponentials", IEEE Antennas and Propagation Magazine, vol. 37, No. 1, Feb. 1995.
PCT Search Report for Application No. PCT/US2017/035307, dated Sep. 6, 2017 3 pages.
PCT Written Opinion of the International Searching Authority for Application No. PCT/US2017/035307, dated Sep. 6, 2017, 7 pages.
Restriction Requirement for U.S. Appl. No. 15/173,531, dated Apr. 10, 2018, 6 pages.
Non-Final Office Action for U.S. Appl. No. 15/173,531, dated Sep. 6, 2018, 14 pages.
International Search Report and Written Opinion for PCT/US2018/047422, dated Jan. 4, 2019, 12 pages.
Notice of Allowance for U.S. Appl. No. 15/684,893, dated May 8, 2019, 11 pages.
Office Action for U.S. Appl. No. 15/684,893, dated Feb. 23, 2018, 34 pages.
Final Office Action for U.S. Appl. No. 15/684,893, dated Sep. 19, 2018, 55 pages.

\* cited by examiner

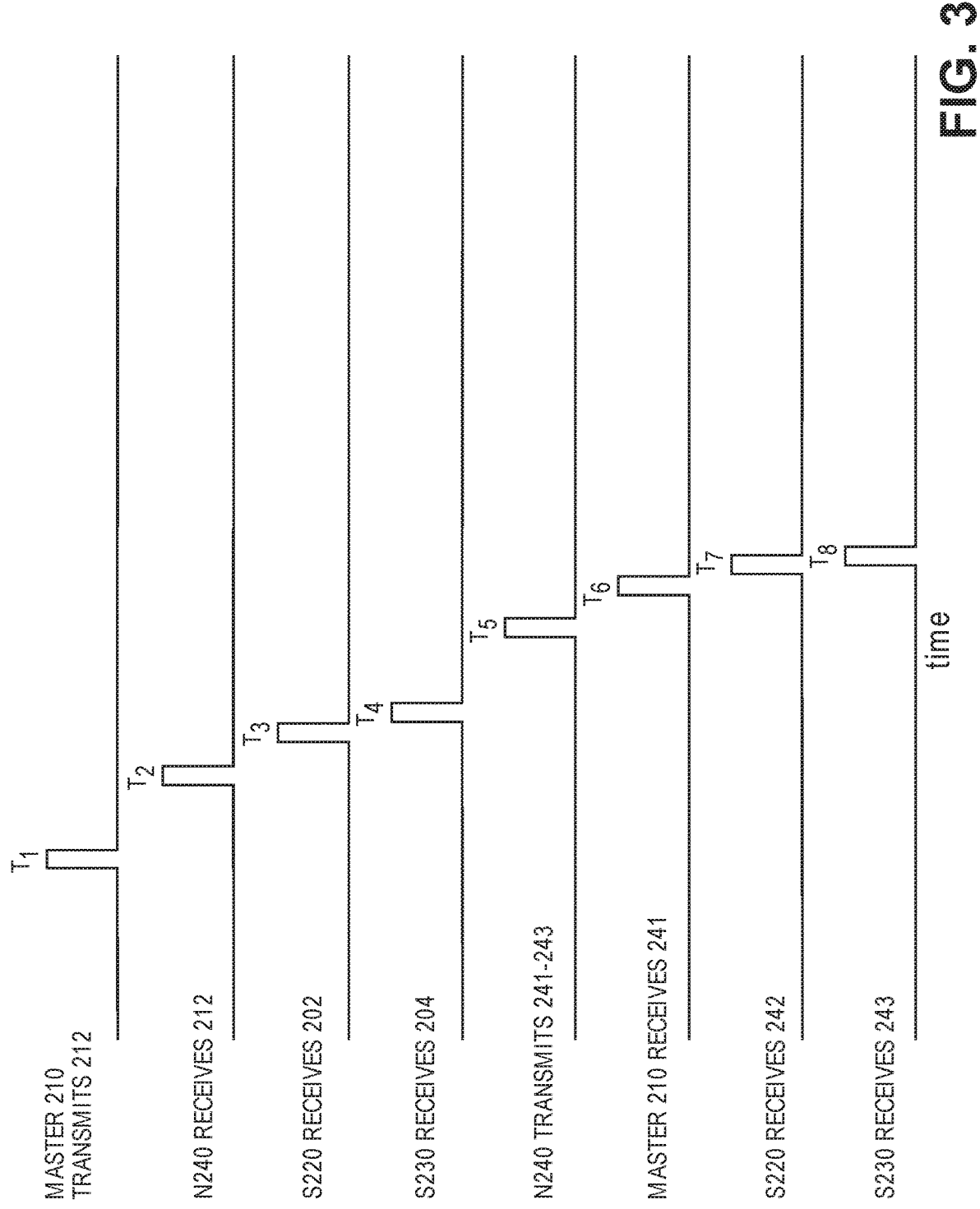

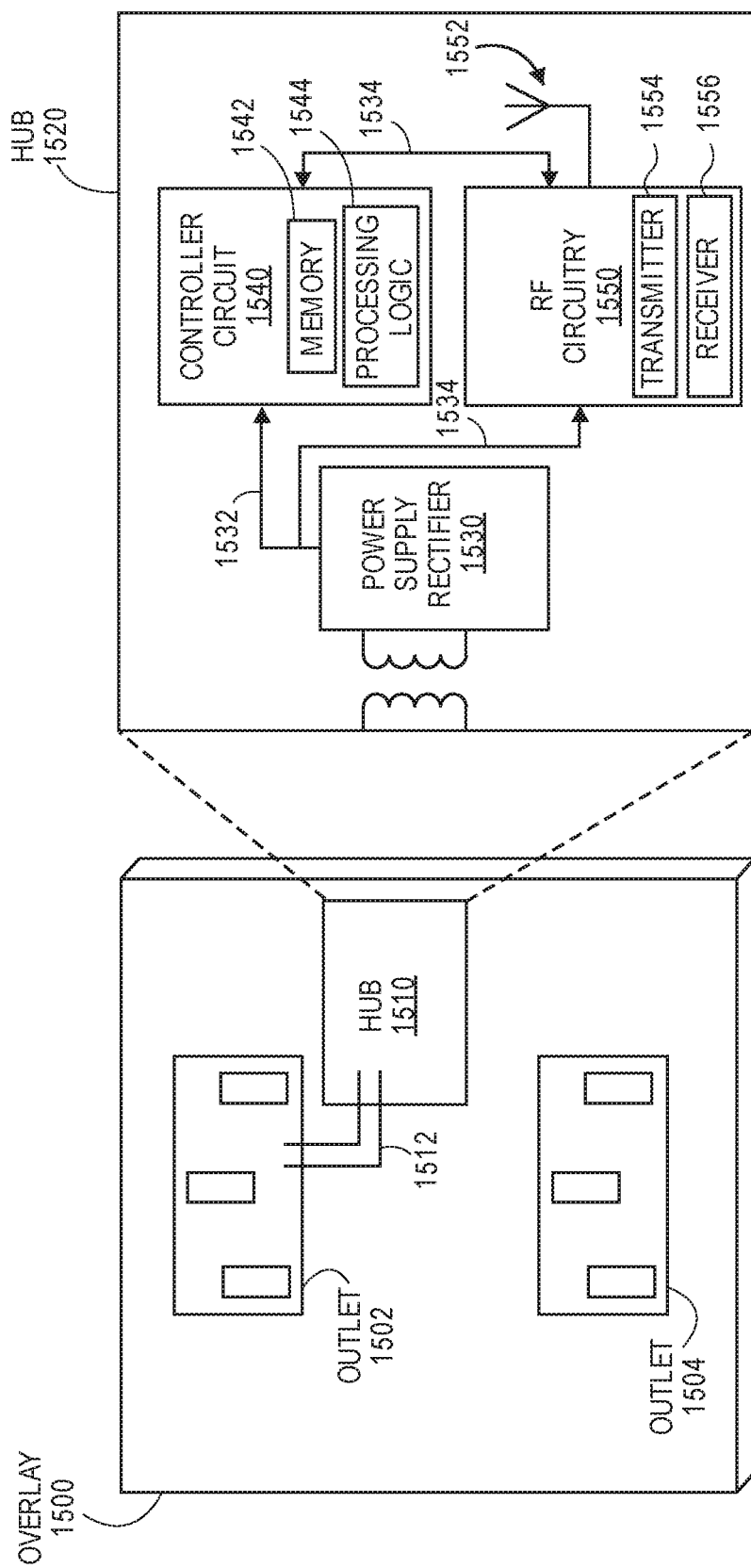

SYSTEMS AND METHODS FOR PRECISE RADIO FREQUENCY LOCALIZATION USING TIME SWEEP TIME DIFFERENCE OF ARRIVAL

RELATED APPLICATIONS

This application is a continuation in Part of application Ser. No. 15/684,893, filed Aug. 23, 2017, entitled: SYSTEMS AND METHODS FOR PRECISE RADIO FREQUENCY LOCALIZATION USING TIME DIFFERENCE OF ARRIVAL, the contents of which are incorporated by reference herein.

FIELD

Embodiments of the invention pertain to systems and methods for precise radio frequency localization using time difference of arrival information.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors, and will include a radio and a power source for powering the operation of the sensor node. Location detection of nodes in indoor wireless networks is useful and important in many applications.

Localization based on time difference of arrival (TDoA) technique for multilateration is performed using radio frequency measurements for determining location of wirelessly equipped objects in three dimensional space. RF-based localization may be performed in numerous ways. An exemplary implementation includes a hub and multiple sensor nodes. Note that the hub may be replaced with a node, or indeed, one or more of the nodes may be replaced with a hub. Distances are estimated using radio frequency techniques between all the individual pairs via RF communications. In TDoA, one node transmits a signal. Multiple other nodes receive the signal, and the time difference between reception at each receive node is calculated. TDoA requires synchronization of the receivers to accurately measure the difference in receive times. This can be done by operating all of the receivers on a shared clock and comparing absolute timestamps. In systems where a shared clock is not available, the receivers must be synchronized in another way.

SUMMARY

For one embodiment of the present invention, systems and apparatuses for determining locations of wireless sensor nodes in a network architecture are disclosed herein. In one example, an asynchronous system includes first and second wireless nodes each having a wireless device with one or more processing units and RF circuitry for transmitting and receiving communications in the wireless network architecture. The system also includes a third wireless node having an unknown location and a wireless device with a transmitter and a receiver to enable communications with the first and second wireless nodes in the wireless network architecture. The one or more processing units of the first wireless node are configured to transmit instructions to a cloud based entity or execute instructions to determine a location coordinate hypothesis and a transmit time hypothesis for a transmitted communication of the third wireless node, determine an error function associated with the transmit time hypothesis for each received path j of the receiving first and second wireless nodes at the location coordinate hypothesis, and determine a probability function of the error function for each received path j of the first and second wireless nodes using statistical properties of path measurement accuracy.

In another example, a computer implemented method for localization of a wireless arbitrary device in a wireless network architecture, comprises initializing a wireless network architecture having a plurality of wireless anchor nodes I, determining location coordinate hypothesis in three dimensions for the wireless arbitrary device having an unknown location, calculating distance d, from each wireless anchor node i to the location coordinate hypothesis, and obtaining channel state information from each wireless anchor node i and signal arrival time stamp $T_i$ from each wireless anchor node i.

In another example, a computer implemented method for localization of a wireless node in a wireless network architecture, comprises initializing a wireless network architecture having a plurality of wireless anchor nodes, determining, with at least one of an anchor node and a cloud based entity, a location coordinate hypothesis of the wireless node having an unknown location, calculating distance from each anchor node i to the location coordinate hypothesis, and obtaining channel state information and signal arrival time stamp $T_i$ from each anchor node i.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIG. 3 illustrates a timing diagram for communications of the system 200 in accordance with one embodiment.

FIG. 7A shows an exemplary embodiment of a hub implemented as an overlay 1500 for an electrical power outlet in accordance with one embodiment.

FIG. 7B shows an exemplary embodiment of an exploded view of a block diagram of a hub implemented as an overlay for an electrical power outlet in accordance with one embodiment.

DETAILED DESCRIPTION

Figure 1A:
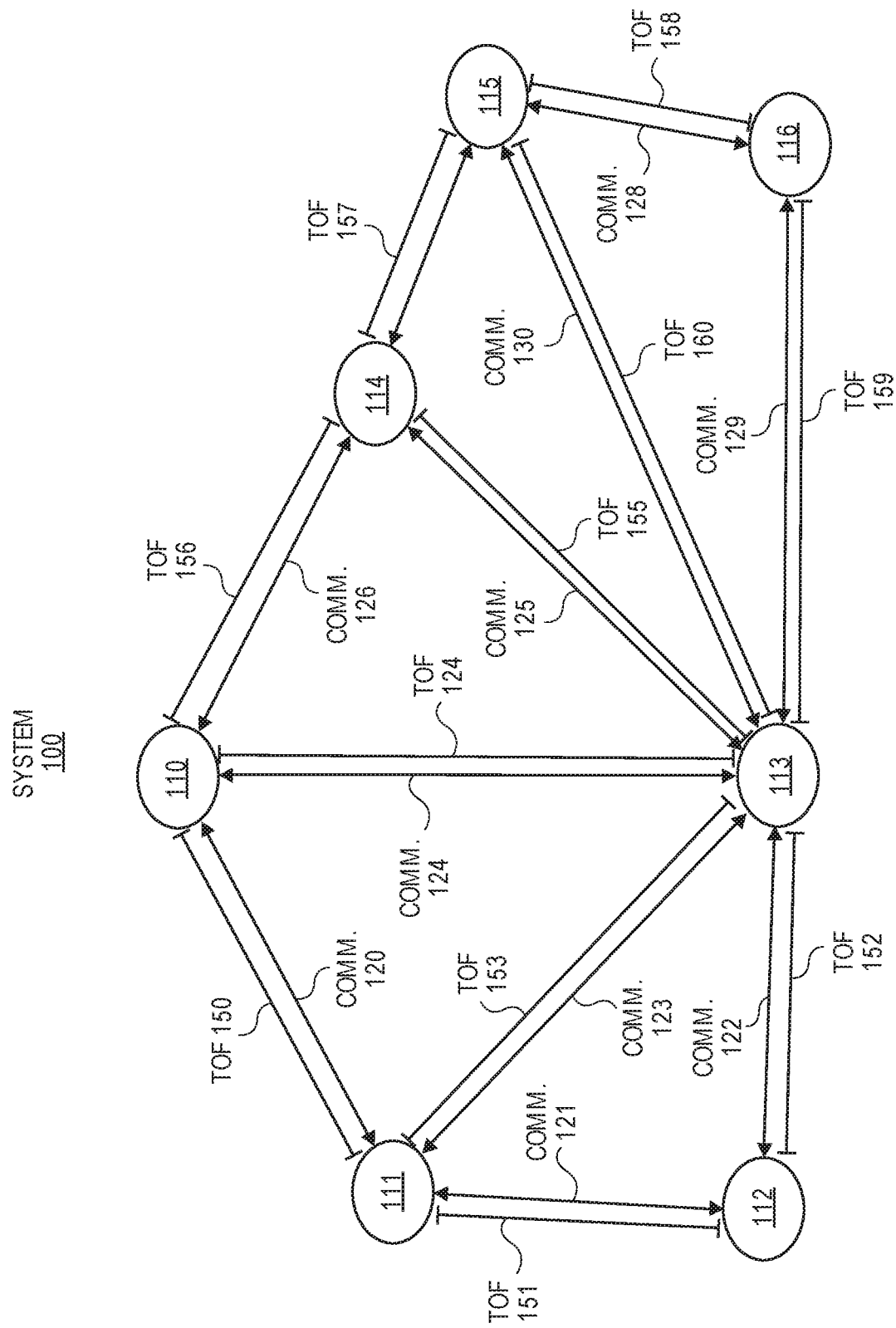
FIG. 1A shows an exemplar system of wireless nodes in accordance with one embodiment.

Systems and methods for precise radio frequency localization using time difference of arrival information are disclosed herein. In one example, an asynchronous system for localization of nodes in a wireless network architecture includes first, second, and third wireless nodes each having a wireless device with one or more processing units and RF circuitry for transmitting and receiving communications in the wireless network architecture. The system also includes a fourth wireless node having an unknown location and a wireless device with a transmitter and a receiver to enable communications with the first, second, and third wireless nodes in the wireless network architecture. The first wireless node transmits a communication to the second, third, and fourth wireless nodes, receives a communication with an acknowledgement packet from the fourth wireless node, and determines time difference of arrival information between the first and second wireless nodes and between the first and third wireless nodes.

In one example, the one or more processing units of the first wireless node are configured to execute instructions for a multilateration algorithm to determine a location of the fourth wireless node using the time difference of arrival information.

In various applications of wireless sensor networks, it may be desirable to determine the location of sensor nodes within the network. For example, such information may be used to estimate the relative position of sensors such as security cameras, motion sensors, temperature sensors, and other such sensors as would be apparent to one of skill in the art. This information may then be used to produce augmented information such as maps of temperature, motion paths, and multi-view image captures. Therefore, localization systems and methods are desired to enable accurate, low-power, and context-aware localization of nodes in wireless networks, particularly in indoor environments. For the purpose of this, indoor environments are also assumed to include near-indoor environments such as in the region around building and other structures, where similar issues (e.g., presence of nearby walls, etc.) may be present.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

Embodiments of the invention provide systems, apparatuses, and methods for localization detection in indoor environments. U.S. patent application Ser. No. 14/830,668 filed on Aug. 19, 2015, which is incorporated by reference herein, discloses techniques for RF-based localization. Specifically, the systems, apparatuses, and methods implement localization in a wireless sensor network that primarily uses a tree network structure for communication with periodic mesh-based features for path length estimation when localization is needed. The wireless sensor network has improved accuracy of localization while simultaneously providing good quality of indoor communication by using high-frequencies for localization and lower frequencies for communication.

Tree-like wireless sensor networks are attractive for many applications due to their reduced power requirements associated with the radio signal reception functionality. An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607,048 filed on Jan. 29, 2015, and U.S. patent application Ser. No. 14/607,050 filed on Jan. 29, 2015, which are incorporated by reference in entirety herein.

Another type of wireless network that is often used is a mesh network. In this network, communication occurs between one or more neighbors, and information may then be passed along the network using a multi-hop architecture. This may be used to reduce transmit power requirements, since information is sent over shorter distances. On the other hand, receive radio power requirements may increase, since it is necessary for the receive radios to be on frequently to enable the multi-hop communication scheme.

FIG. 1A illustrates an exemplar system of wireless nodes in accordance with one embodiment. This exemplar system 100 includes wireless nodes 110-116. The nodes communicate bi-directionally with communications 120-130 (e.g., node identification information, sensor data, node status information, synchronization information, localization information, other such information for the wireless sensor network, time of flight (TOF) communications, etc.). Based on using time of flight measurements, path lengths between individual pairs of nodes can be estimated. An individual time of flight measurement between nodes 110 and 111 for example, can be achieved by sending a signal at a known time from node 110 to node 111. Node 111 receives the signal, records a time stamp of reception of the signal of the communications 120, and can then, for example, send a return signal back to A, with a time stamp of transmission of the return signal. Node 110 receives the signal and records a time stamp of reception. Based on these two transmit and receive time stamps, an average time of flight between nodes 110 and 111 can be estimated. This process can be repeated multiple times and at multiple frequencies to improve precision and to eliminate or reduce degradation due to poor channel quality at a specific frequency. A set of path lengths can be estimated by repeating this process for various node pairs. For example, in FIG. 1, the path lengths are TOF 150-160. Then, by using a geometric model, the relative position of individual nodes can be estimated based on a triangulation-like process.

This triangulation process is not feasible in a tree-like network, since only path lengths between any node and a hub can be measured. This then limits localization capability of a tree network. To preserve the energy benefits of a tree network while allowing localization, in one embodiment of this invention, a tree network for communication is combined with mesh-like network functionality for localization. Once localization is complete with mesh-like network functionality, the network switches back to tree-like communication and only time of flights between the nodes and the hub are measured periodically. Provided these time of flights are held relatively constant, the network then assumes nodes have not moved and does not waste energy is attempting to re-run mesh-based localization. On the other hand, when a change in path length in the tree network is detected, the network switches to a mesh-based system and re-triangulates to determine location of each node in the network.

In another example, a multilateration algorithm is performed to determine a location of a wireless node having an unknown location using time difference of arrival information for a plurality of nodes.

Figure 1B:
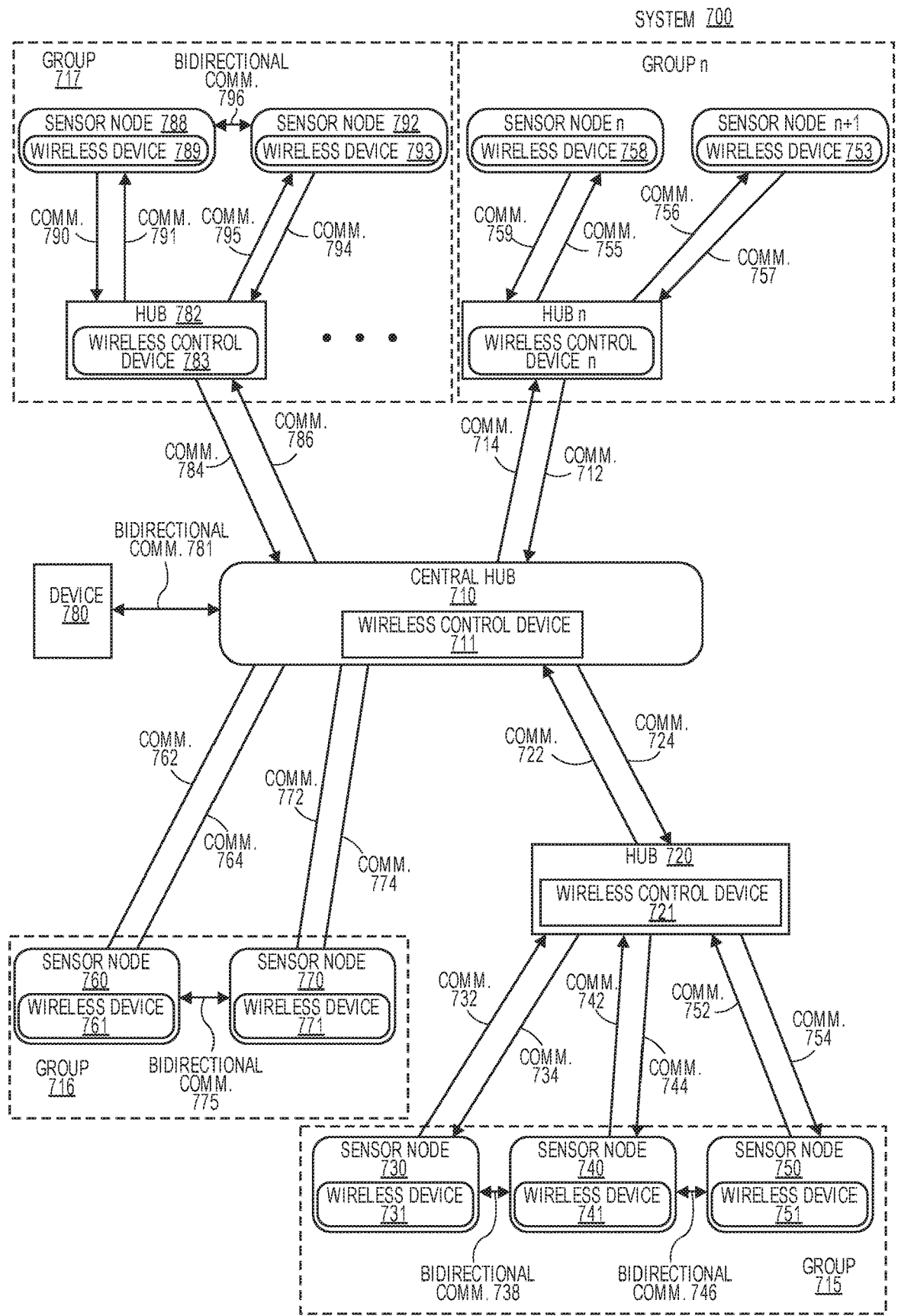
FIG. 1B shows an exemplar system of wireless nodes having multiple hubs for communicating in accordance with one embodiment.

FIG. 1B shows an exemplar system of wireless nodes having multiple hubs for communicating in accordance with one embodiment. The system 700 includes a central hub 710 having a wireless control device 711, hub 720 having a wireless control device 721, hub 782 having a wireless control device 783, and additional hubs including hub n having a wireless control device n. Additional hubs which are not shown can communicate with the central hub 710, other hubs, or can be an additional central hub. Each hub communicates bi-directionally with other hubs and one or more sensor nodes. The hubs are also designed to communicate bi-directionally with other devices including device 780 (e.g., client device, mobile device, tablet device, computing device, smart appliance, smart TV, etc.).

The sensor nodes 730, 740, 750, 760, 770, 788, 792, n, and n+1 (or terminal nodes) each include a wireless device 731, 741, 751, 761, 771, 789, 793, 758, and 753, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the central hub 710 communicates with hubs 720, 782, hub n, device 780, and nodes 760 and 770. These communications include communications 722, 724, 774, 772, 764, 762, 781, 784, 786, 714, and 712 in the wireless asymmetric network architecture. The central hub having the wireless control device 711 is configured to send communications to other hubs and to receive communications from the other hubs for controlling and monitoring the wireless asymmetric network architecture including assigning groups of nodes and a guaranteed time signal for each group.

The hub 720 communicates with central hub 710 and also sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

In one embodiment, a central hub (or other hubs) assign nodes 760 and 770 to a group 716, nodes 730, 740, and 750 to a group 715, nodes 788 and 792 to a group 717, and nodes n and n+1 to a group n. In another example, groups 716 and 715 are combined into a single group.

By using the architecture illustrated in FIG. 1, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

In one embodiment, the nodes spend most of their time (e.g., more than 90% of their time, more than 95% of their time, approximately 98% or more than 99% of their time) in a low-energy non-communicative state. When the node wakes up and enters a communicative state, the nodes are operable to transmit data to the lowest-level hubs. This data may include node identification information, sensor data, node status information, synchronization information, localization information and other such information for the wireless sensor network.

To determine the distance between two objects based on RF, ranging measurements are performed (i.e., RF communication is used to estimate the distance between the pair of objects). To achieve this, an RF signal is sent from one device to another. FIGS. 3-8C of U.S. patent application Ser. No. 15/173,531 illustrate embodiments of time of flight measurement systems.

Time of flight measurements are inherently sensitive to the timing of operations within the network, and therefore, the clocking of the devices performing the measurements is important. In one embodiment, a node at an unknown location can be located via TDoA without a shared clock. The receive nodes are synchronized using an additional transaction between the known nodes. Note that the locations of the known nodes can be determined using localization as described in the U.S. patent application Ser. No. 15/173,531.

Figure 2A:
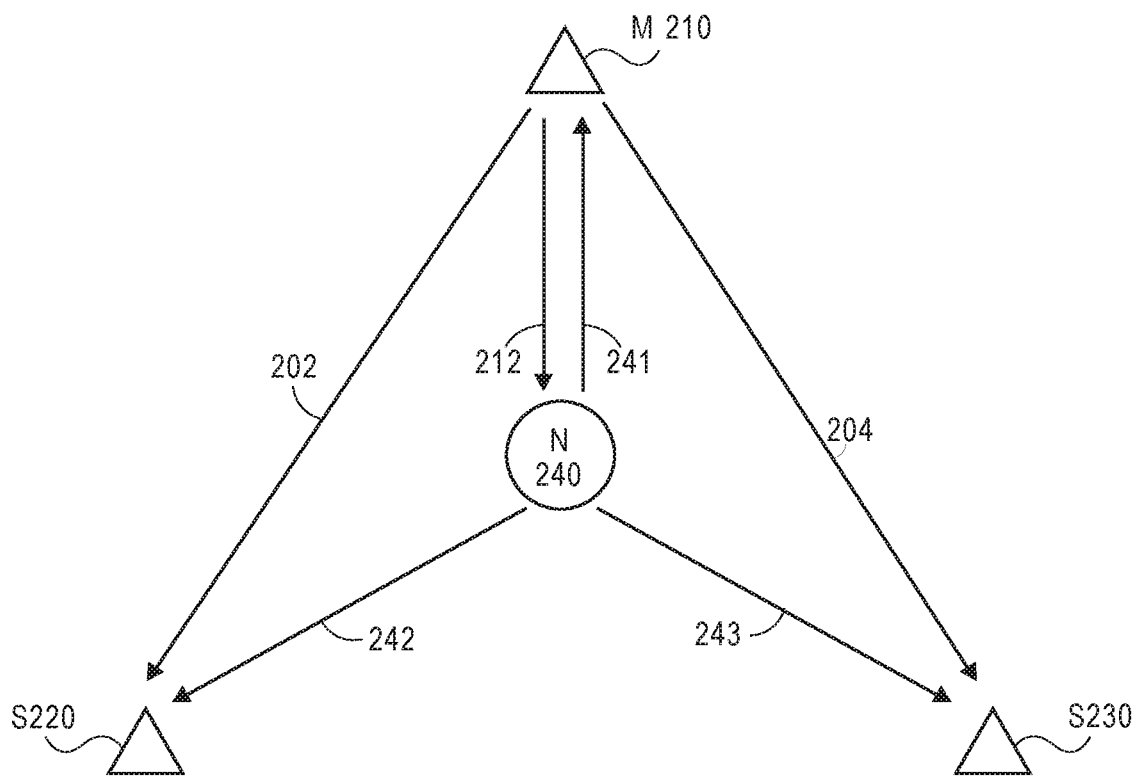
FIG. 2A illustrates a system for localization of nodes utilizing time difference of arrival in accordance with one embodiment.
Figure 2B:
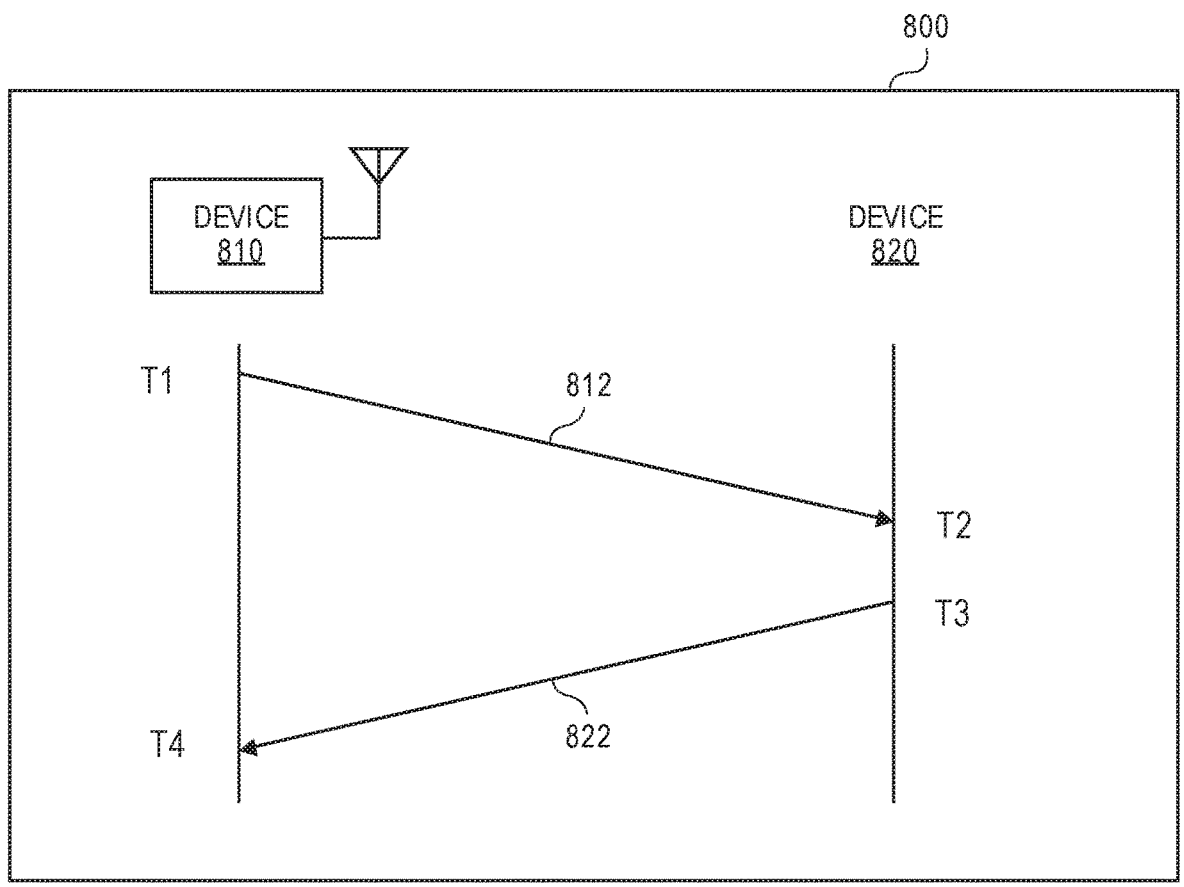
FIG. 2B illustrates an asynchronous system that is used for time of flight estimation in accordance with another embodiment.

FIG. 2A illustrates a system for localization of nodes utilizing time difference of arrival in accordance with one embodiment. The system 200 is configured to have one master node 210 (M210), one node 240 at unknown location (N240), and sniff nodes (e.g., S220, 230, etc.). The master node 210 first performs two way time of flight with RTT and fractional distance (as described in the U.S. patent application Ser. No. 15/173,531) to each of the sniff nodes For example, FIG. 2B illustrates an asynchronous system that is used for time of flight estimation in accordance with one embodiment. A device 810 first sends a RF signal 812 having a packet to device 820 at time T1. The packet arrives at the device 820 at time T2, triggering the packet detection algorithm in device 820 to register this time. Device 820 then sends back a signal 822 having a packet at time T3, which arrives at device 810 at time T4 and triggers the device 810 to register the time and process the waveform. Notice that unlike the case of fully synchronous system, T1 and T4 are times recorded on device 810 and therefore is referenced to its reference clock. T2 and T3 are recorded based on the time reference of device 820. The coarse time estimation is done as $$2 \times ToF = (T4-T1) - (T3-T2)$$

Because T4 and T1 are sampled at the same clock, there is no arbitrary phase between T4 and T1. Therefore, T4−T1 is accurate in time; the same principle applies to T3−T2. Therefore, this measurement is immune to any phase-walking between the two devices resulting from the asynchronous nature of this system. Similar to the previous embodiment, this measurement is limited by the resolution of the sampling clock period of T1/T2/T3/T4. In order to improve this accuracy, a frequency response measurement can be performed on both devices. Device 820 measures the channel response using the packet from device 810 and device 810 measures the channel response using the packet from device 820. Because the two devices are not synchronous, there is an uncertainty in the phase between the two clocks, annotated as $T_{offset}$ here. This phase offset of the clock manifests itself as an extra phase of the channel response measurement on each side, but it can be eliminated by multiplying the channel responses from the two sides. Assuming the channel response is the same as before, then the measurement from device 820 will be $$H_{820}(f) = H(f) e^{-j \, 2\pi f \, T_{offset}}$$

The measurement from the device 810 will be $$H_{810}(f) = H(f) e^{+j \, 2\pi f \, T_{offset}}$$

The combined channel response is therefore $$H_{810}(f) H_{820}(f) = H(f)^2 = (\Sigma A_k e^{-j \, 2\pi f \, \Delta T_k})^2$$

which cancels out the phase difference between the two clocks. Similar to the previous embodiment, algorithms such as matrix pencil, MUSIC, etc. can be used to estimate the delay from $H_{810}(f) H_{820}(f)$, which produces the 2 min$\{\Delta T_k\}$, and the distance measurement is given by $$\text{Distance} = [(T4-T1)/2 - (T3-T2)/2 - S\{H_{810}(f) H_{820}(f)\}/2] \times C$$

Alternatively $T_{offset}$ can be estimated from $$H_{810}(f)/H_{820}(f) = e^{+2j \, 2\pi f \, T_{offset}}$$

The $T_{offset}$ is half the phase slope of the divided channel responses. The channel response in either direction can be corrected by the calculated offset. The distance estimation can then be calculated as $$\text{Distance} = [(T4-T1)/2 - (T3-T2)/2 - S\{H_{810}(f)\} - T_{offset}] \times C$$

Or $$\text{Distance} = [(T4-T1)/2 - (T3-T2)/2 - S\{H_{820}(f)\} + T_{offset}] \times C$$

This method has advantages over the multiplication method. The H(f)² channel response includes terms at double the amplitude and distance of each path as well as cross terms for every 2 path permutation. That is for a 2 path case, $A_{810}^2 e^{j \, 2\pi f 2 \, \Delta T1}$, $A_{820}^2 e^{j \, 2\pi f 2 \, \Delta T2}$ and $A_{810} A_{820} e^{j \, 2\pi f (\Delta T1 + \Delta T2)}$. The fine estimation methods are more effective and more robust to noise when applied to the unidirectional channel response H(f) as there are less paths to distinguish and lower dynamic range.

Figure 2C:
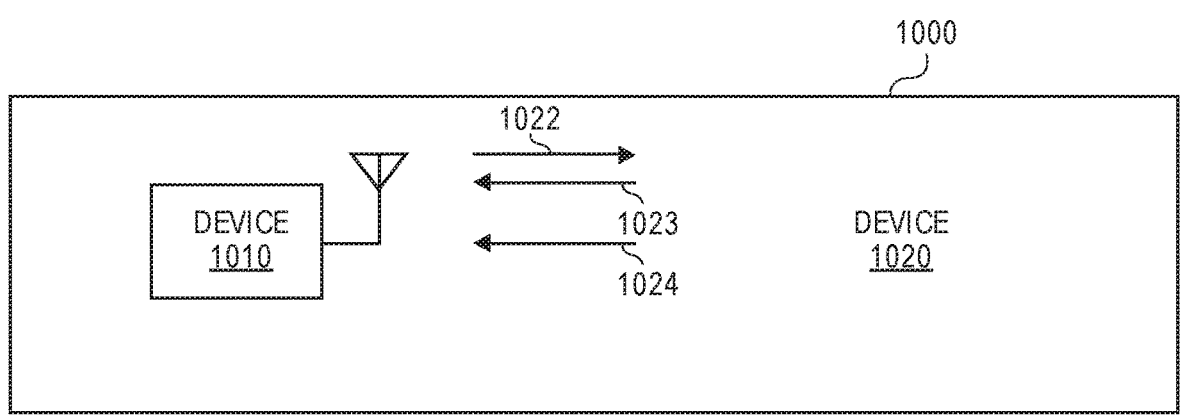
FIG. 2C illustrates in one embodiment a 2-way ToF measurement system 1000.

The aforementioned short path elimination algorithm can also be used in asynchronous systems such as those disclosed above As shown above, in an asynchronous system, the information from the two devices needs to be combined for calculation. In order to do that, in one embodiment, one of the devices can send the information to the other device, either using the same RF signals (e.g., 812, 822, 1022, 1023) mentioned before, or using an independent RF signal path 1024, as shown in FIG. 2C in one embodiment of a 2-way ToF measurement system 1000.

FIG. 3 illustrates a timing diagram for communications of the system 200 in accordance with one embodiment. N240 is configured to send a communication (e.g., transmitted packet) that is received as packets 241-243 (e.g., acknowledgement packet) in response to the communication 212 (e.g., unicast packets) from the master node 210. This system is set up utilizing the master node as an access point (AP) and having the unknown node (e.g., sensor node, mobile device, smart device, smart watch, etc.) associated with it or by other means. The sniff nodes 220 and 230 are configured to receive any packets sent by the master node or N240. The master node sends a communication 212 (e.g., forward packet) to N240 at time $T_1$. N240 receives this communication 212 at time $T_2$. Each of the sniff nodes records a detection timestamp and channel state information (CSI) of a received communication (e.g., node 220 receives forward packet 202 at time $T_3$, node 230 receives forward packet 204 at time $T_4$). The packets 202, 204, and 212 originate from the same communication from M210. The unknown node N240 transmits a communication that is received as packets 241-243 (e.g., acknowledgement packets at time $T_5$) in response to receiving the communication 212. The sniff nodes and the master node all record a timestamp and CSI of the received communications 241-243 (e.g., acknowledgement packets received at time $T_6$, $T_7$, $T_8$).

The master to sniff ToF and the timestamp and CSI information at the master and sniff nodes can then be combined to determine the location of node 240. The $T_{DoA}$ between the master and each sniff node is calculated in accordance with equation 1 below. Then these TDoA values can be used in a standard TDoA multilateration algorithm to determine the location of N240.

The TDoA between each sniff node and the master node is determined as follows. In an ideal case, the TDoA is simply a delta between a first time $T_6$ when the master node receives the acknowledge packets from node 240 and a second time $T_7$ when the sniff nodes receive the acknowledgement packets from the node 240.

However, the master and sniff nodes have independent clocks references with counter offsets as well as phase and frequency offsets from each other. To resolve this, in one example, a packet transmission time of the communication 212 (e.g., forward packets 212 at time $T_1$) at the master node is used as the time reference for both the master node and sniff nodes.

$$T_{DoA\, M210-S220} = T_6 - T_7 \quad \text{Equation 1}$$

$$= (T_6 - T_1) - (T_7 - T_1)$$

$$= (T_6 - T_1) - (T_7 - (T_3 - T_{oF\, M210-S220}))$$

$$= (RTT_{M210-N240\, sampling} +$$

$$T_{frac\, M210-N240}) -$$

$$(T_{S220\, Ack\, Rx\, sampling} +$$

$$T_{S220\, Ack\, Rx\, frac} -$$

$$(T_{S220\, forw\, Rx\, sampling} +$$

$$T_{S220\, forw\, Rx\, frac} -$$

$$T_{oF\, M210-S220}))$$

The time of the sniff nodes receiving communications 242 and 243 (e.g., sniff acknowledgement reception) can be aligned to the master forward packet transmissions by subtracting a timestamp of the acknowledgement forward reception for receiving communications 242 and 243 and the previously measured ToF calculated between the master and sniff node.

The time resolution of the TDoA can be finer than the rate of the sampling clock by using the channel state information (CSI) for a fractional sample estimate of each packet reception. The CSI can be used to calculate the fractional sample estimate by using the slope of the phase (in a single line of sight path) or using techniques such as matrix pencil, MUSIC, or IFFT. FIGS. 2 and 3 and equation 1 show an example of the system and how the TDoA is calculated. Equation 2 shows how the delays introduced from differences in the reference clocks are cancelled.

$$T'_6 = T6 + t_{dM210-N240} + t_{dN240-M210} \quad \text{Equation 2}$$

$$T'_7 = T_7 + t_{dS220-N240} + t_{dN240-M210}$$

$$T'_3 = T_3 + t_{dS220-M210}$$

$$T'_{DoA} = T'_6 - T'_7$$

$$= T_{DoA} + t_{dM210-N240} + t_{dN240-M210} -$$

$$t_{dS220-N240} + t_{dN240-M210} + t_{dS220-M210}$$

Note: $t_{dS220-M210} = t_{dS220-N240} + t_{dN240-M210}$ $$= t_{dS220-N240} - t_{dM210-N240}$$

$$t_{dS220-M210} - t_{dS220-M240} + t_{dM210-N240} = 0$$

$$T'_{DoA} = T_{DoA}$$

To improve signal to noise ratio (SNR), the process can be repeated with multiple packets. The TDoA can be calculated per packet and then averaged. Alternatively, the timestamps and CSIs can be averaged before combining. To average CSIs, the magnitudes and phases must be averaged independently and then combined. By configuring the system again with a different unknown node, the locations of multiple nodes can be found.

Figure 4:
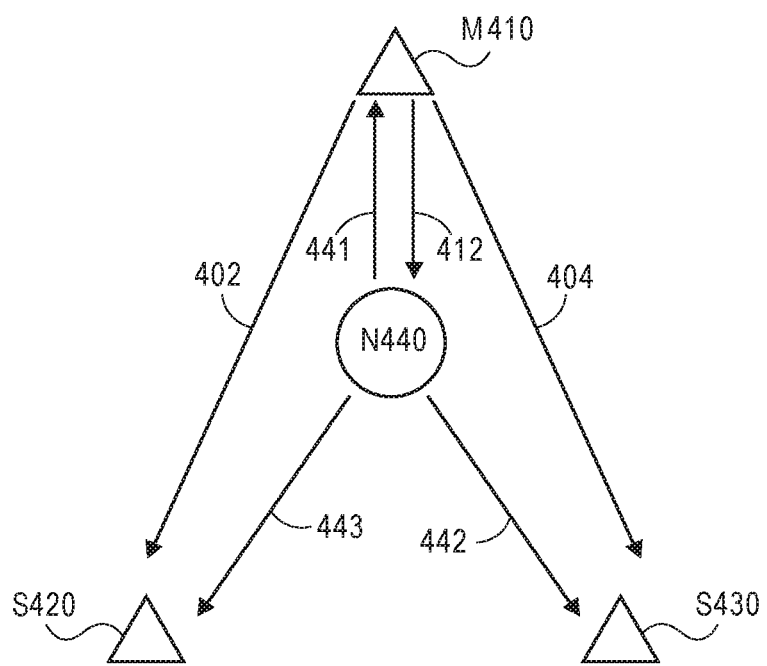
FIG. 4 illustrates a system for localization of nodes utilizing time difference of arrival in accordance with an alternative embodiment.
Figure 5:
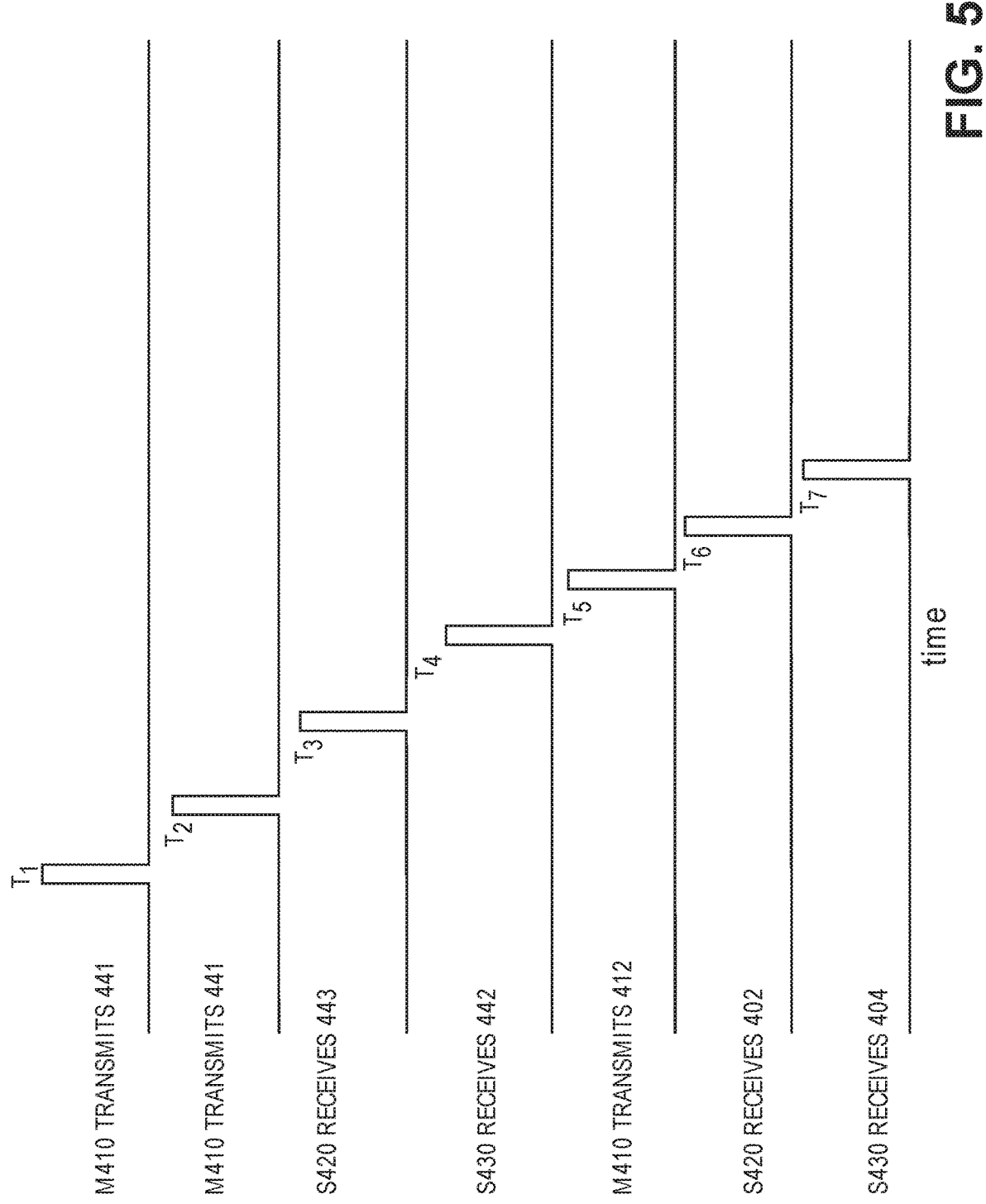
FIG. 5 illustrates a timing diagram for communications of the system 400 in accordance with one embodiment.

FIG. 4 illustrates a system for localization of nodes utilizing time difference of arrival in accordance with an alternative embodiment. The system 400 is configured to have one master node 410 (M410), one node 440 at unknown location (N440), and sniff nodes (e.g., S420, S430, etc.). FIG. 5 illustrates a timing diagram for communications of the system 400 in accordance with one embodiment. The unknown node N440 can initiate the packet transaction. N440 sends a communication 441 (e.g., forward packet 441) to the master (M) node 410 at time $T_1$. The master node 410 receives the communication 441 at time $T_2$. The master node 410 responds with a communication 412 (e.g., an acknowledgement packet 412) at time $T_5$. The sniff nodes 420 and 430 listen to the communications 442-443 at times $T_4$ and $T_3$ (e.g., forward packets 442-443) from N440 and the communications 402 and 404 (e.g., acknowledgement packet 402 and 404) from the master node 410. The sniff node 420 receives the communication 443 at time $T_3$ and receives the communication 402 at time $T_6$. The sniff node 430 receives the communication 442 at time $T_4$ and receives the communication 404 at time $T_7$. The received packets 441-443 originate from the same communication from N440.

The TDoA is now calculated based on the arrival of the forward packets at the master and sniff nodes from N440. The packet transmission time of the acknowledgement packets from the master node is now used to align the timing between the nodes in accordance with Equation 3 with delta offset equaling $T_6 - T_5 - T_{oF\, M410-S420}$:

$$T_{DoA\, M410-S420} = T_2 - T_3^{M410}$$

$$= T_2 - T_3 - \text{delta offset between}$$

$$\text{clocks of } M410 \text{ and } S420$$

$$= (T_2 - T_3) + T_6 - T_5 - T_{oF\, M410-S420}$$

$$= (T_{2\, sampling} + T_{2\, frac} - T_{3\, sampling} -$$

$$T_{3\, frac}) + T_{6\, sampling} + T_{6\, frac} -$$

$$T_{5\, sampling} - T_{5\, frac} - T_{oF\, M410-S420}$$

Figure 6:
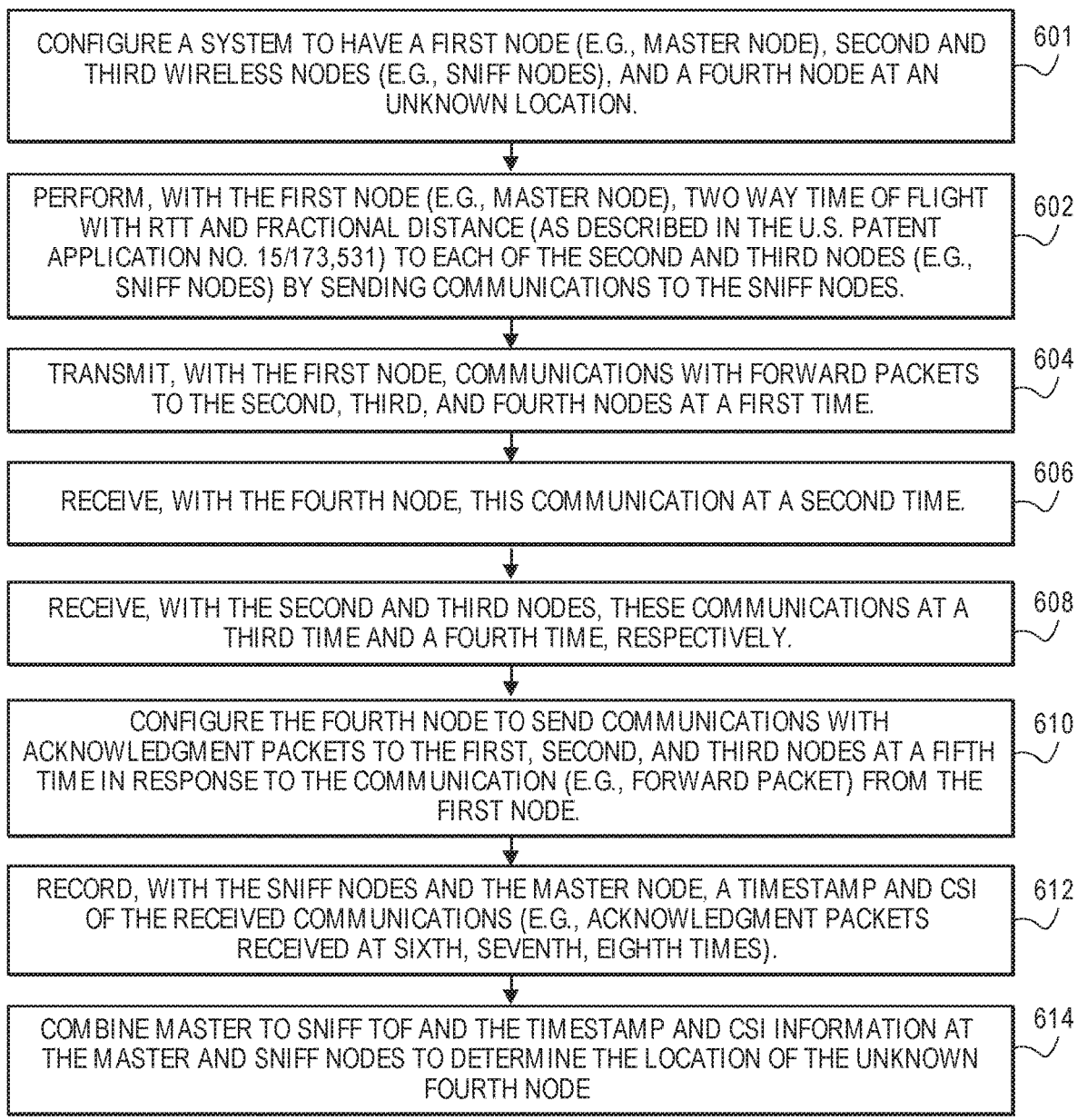
FIG. 6 illustrates a method for determining location estimation of nodes using time difference of arrival techniques in accordance with one embodiment.

FIG. 6 illustrates a method for determining location estimation of nodes using time difference of arrival techniques in accordance with one embodiment. The operations of method 600 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 600.

Upon initialization of a wireless network architecture, at operation 601, the processing logic of a system is configured to have a first node (e.g., master node), second and third wireless nodes (e.g., sniff nodes), and a fourth node (e.g., sensor node, mobile device, smart device, smart watch, etc.) at an unknown location. The first node (e.g., master node) performs two way time of flight with RTT and fractional distance (as described in the U.S. patent application Ser. No. 15/173,531) with of the second and third nodes (e.g., sniff nodes) the sniff nodes at operation 602.

At operation 604, the first node transmits a communication with a forward packet to the second, third, and fourth nodes at a first time. At operation 606, the fourth node receives this communication at a second time. At operation 608, the second and third nodes receive these communications at a third time and a fourth time, respectively. At operation 610, the fourth node is configured to send a communication with an acknowledgement packet to the first, second, and third nodes at a fifth time in response to the communication (e.g., forward packet) from the first node. In one example, this system is set up utilizing the master node as an access point (AP) and having the unknown fourth node associated with it or by other means. The sniff nodes are configured to receive any packets sent by the master node or unknown fourth node. Each of the sniff nodes records a detection timestamp and channel state information (CSI) of a received communication. The sniff nodes and the master node all record a timestamp and CSI of the received communications (e.g., acknowledgement packets received at sixth, seventh, eighth times) at operation 612.

The master to sniff ToF and the timestamp and CSI information at the master and sniff nodes can then be combined to determine the location of the unknown fourth node at operation 614. The $T_{DoA}$ between the master and each sniff node is calculated in accordance with equation 1. Then these TDoA values can be used in a standard TDoA multilateration algorithm to determine the location of N240.

In one example, the TDoA algorithms discussed herein are used to locate a fourth node (e.g., sensor node, mobile device, smart device, smart watch, robot, etc.) at an unknown location. Thus, a user of the fourth node can locate this node without having to search for the node.

The communication between hubs and nodes as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, 5G, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

In one embodiment, by using frequency domain techniques, it is possible to build a model for the received signal from a wireless device and use this model to extract delays with finer resolution than achievable via the sampling clock. This is possible provided that the appropriate channel state information (CSI) is made available, which is possible for example, in Wi-Fi, LTE, or 5G, since CSI is routinely collected as part of the overall OFDM or SC-FDMA implementation.

The implementation of the radio-frequency communication between the terminal nodes and the hubs may be implemented in a variety of ways including narrow-band, channel overlapping, channel stepping, multi-channel wide band, and ultra-wide band communications.

The hubs may be physically implemented in numerous ways in accordance with embodiments of the invention. FIG. 7A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 7B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The RF circuitry 1550 includes at least one of LAN RF circuitry, WAN RF circuitry, and cellular RF circuitry. The hub 1520 can be a wireless control device 1520 or the controller circuit 1540, RF circuitry 1550, and antenna(s) 1552 in combination may form the wireless control device as discussed herein.

Figure 8B:
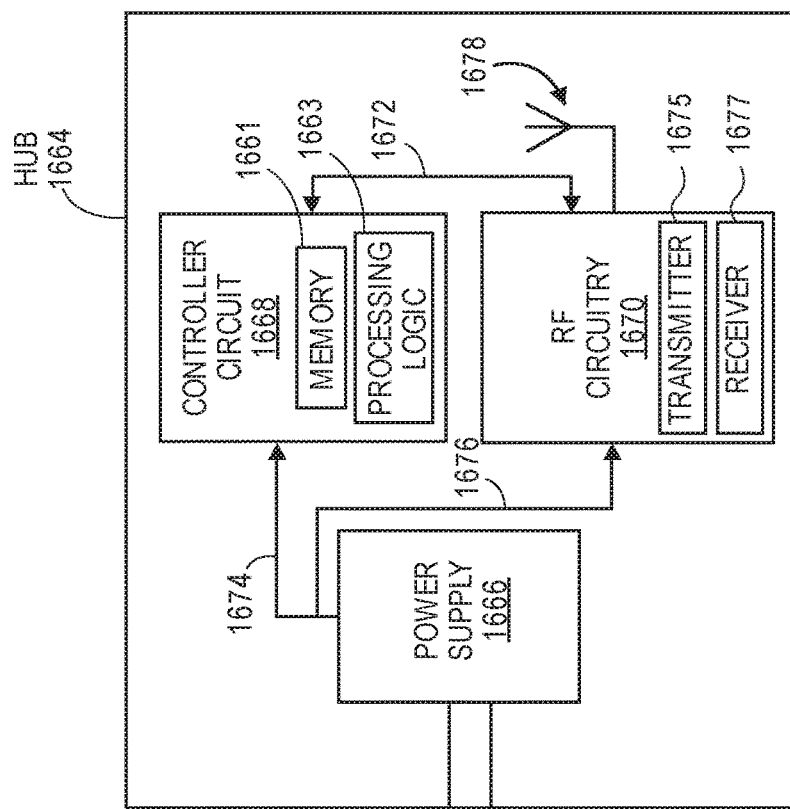
FIG. 8B shows an exemplary embodiment of a block diagram of a hub 964 implemented as a card for deployment in a computer system, appliance, or communication hub in accordance with one embodiment.
Figure 8A:
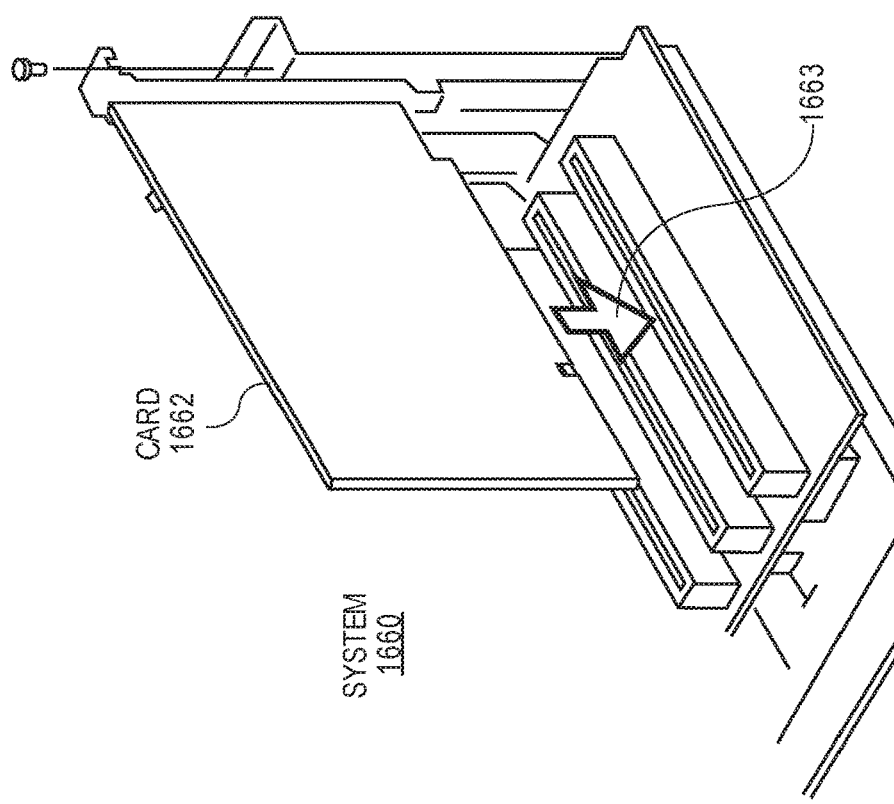
FIG. 8A shows an exemplary embodiment of a hub implemented as a card for deployment in a computer system, appliance, or communication hub in accordance with one embodiment.

FIG. 8A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 8B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and performing localization of the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The RF circuitry 1670 includes at least one of LAN RF circuitry, WAN RF circuitry, and cellular RF circuitry. The hub 1664 can be a wireless control device 1664 or the controller circuit 1668, RF circuitry 1670, and antenna(s) 1678 in combination may form the wireless control device as discussed herein.

Figure 8D:
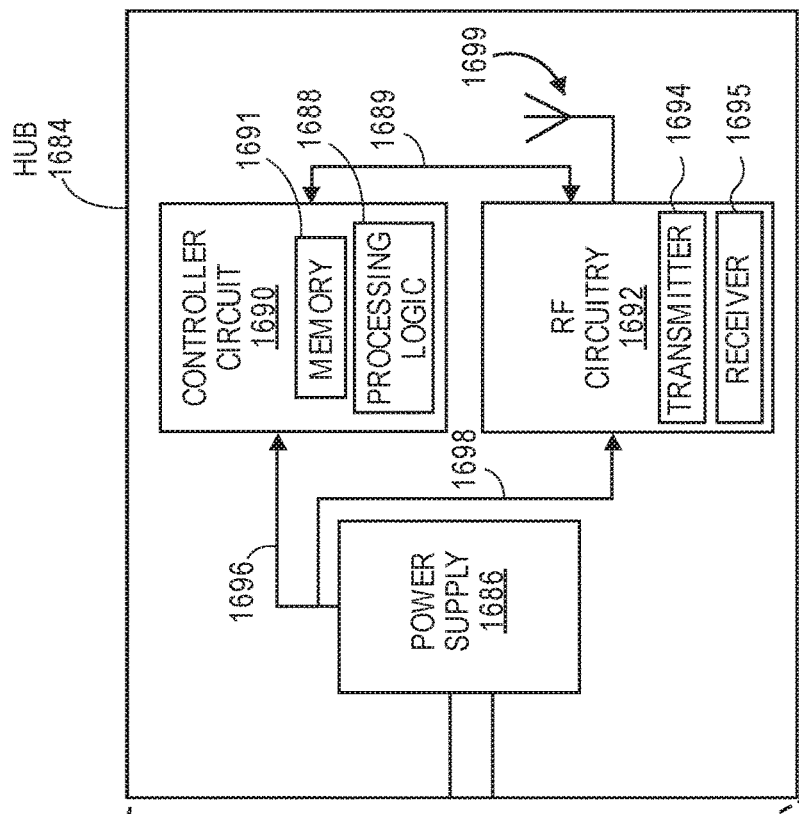
FIG. 8D shows an exemplary embodiment of an exploded view of a block diagram of a hub 1684 implemented within an appliance (e.g., smart washing machine, smart refrigerator, smart thermostat, other smart appliances, etc.) in accordance with one embodiment.
Figure 8C:
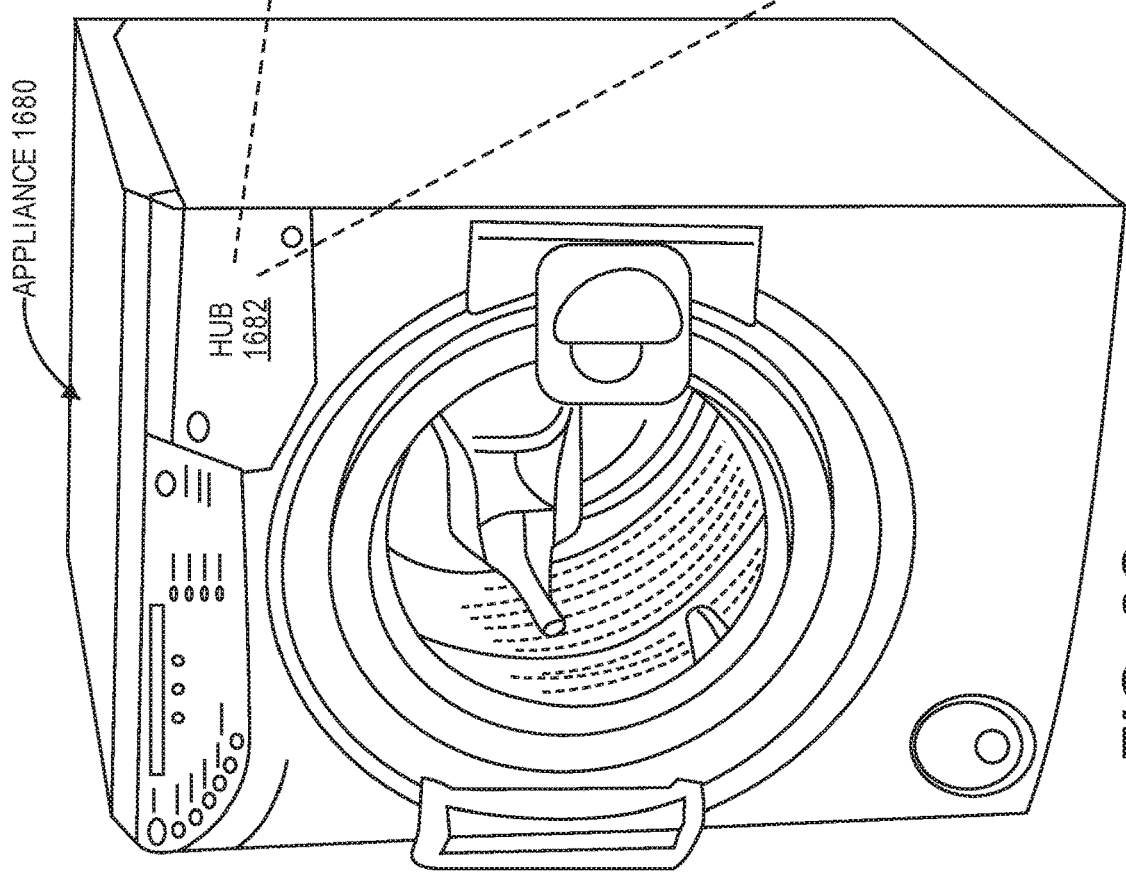
FIG. 8C shows an exemplary embodiment of a hub implemented within an appliance (e.g., smart washing machine, smart refrigerator, smart thermostat, other smart appliances, etc.) in accordance with one embodiment.

FIG. 8C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 8D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The RF circuitry 1692 includes at least one of LAN RF circuitry, WAN RF circuitry, and cellular RF circuitry. The hub 1684 can be a wireless control device 1684 or the controller circuit 1690, RF circuitry 1692, and antenna(s) 1699 in combination may form the wireless control device as discussed herein.

In one example, any of the RF circuitry described herein can include at least one of LAN RF circuitry, WAN RF circuitry, and cellular RF circuitry.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuitry 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture.

In one example, a memory for storing instructions includes one or more processing units to execute instructions for controlling a plurality of sensor nodes in a wireless network architecture and determining locations of the plurality of sensor nodes and radio frequency (RF) circuitry to transmit communications to and receive communications from the plurality of sensor nodes each having a wireless device with a transmitter and a receiver to enable bi-directional communications with the RF circuitry of the apparatus in the wireless network architecture. The one or more processing units of the apparatus are configured to execute instructions to transmit a communication to first, second, and third wireless nodes, to receive a communication with an acknowledgement packet from the third node that has an unknown location, and to determine time difference of arrival information between the apparatus and the first wireless node and between the apparatus and the second wireless node.

In one example, the apparatus is powered by a mains electrical source and the plurality of sensor nodes are each powered by a battery source to form the wireless network architecture.

Various batteries could be used in the wireless sensor nodes, including lithium-based chemistries such as Lithium Ion, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 9:
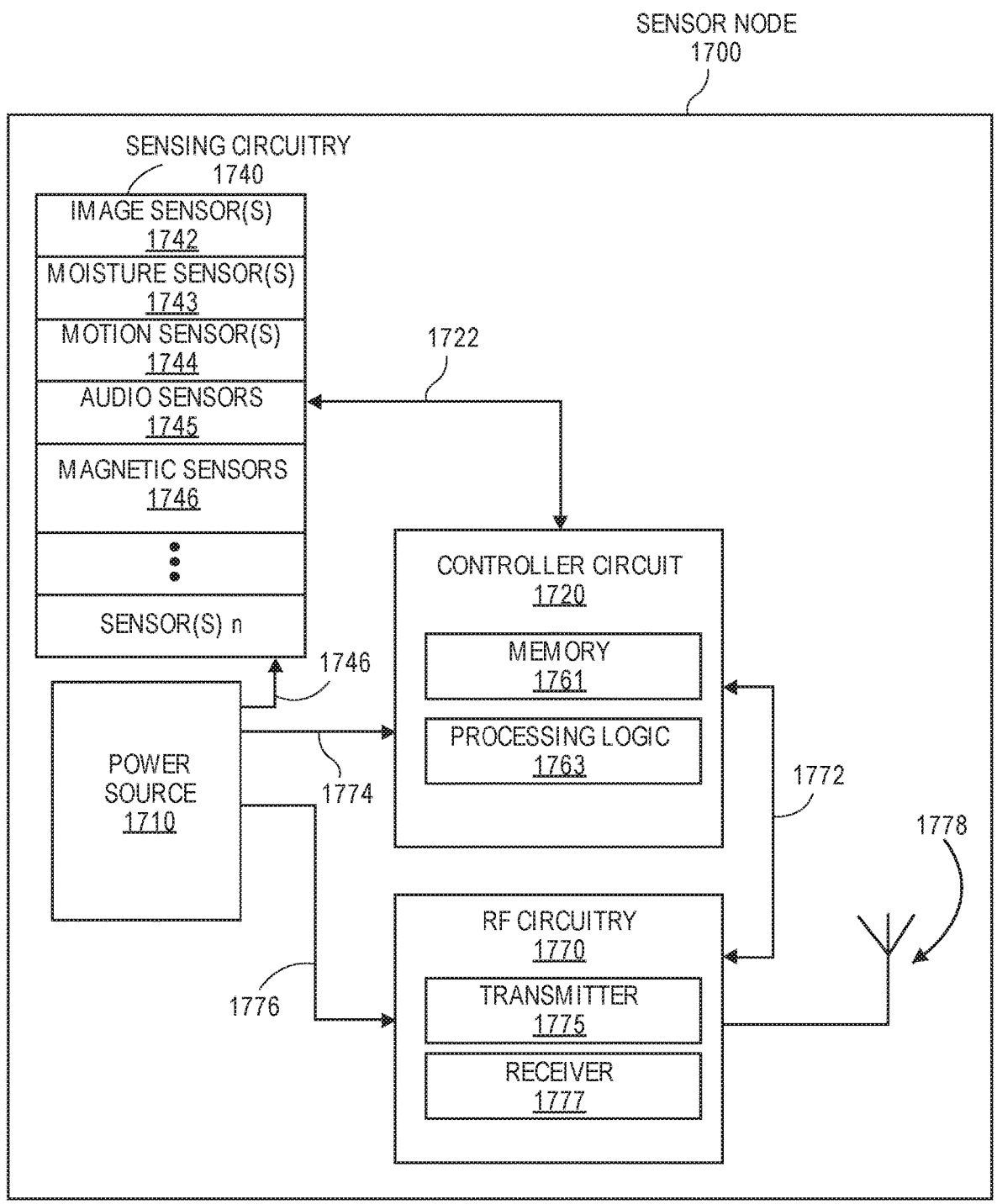
FIG. 9 illustrates a block diagram of a sensor node in accordance with one embodiment.

FIG. 9 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The RF circuitry 1770 includes at least one of LAN RF circuitry, WAN RF circuitry, and cellular RF circuitry. The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

The wireless localization techniques disclosed herein may be combined with other stated information to improve localization accuracy of the overall network. For example, in wireless sensors in which one or more of the nodes contain cameras, captured images can be used with image processing and machine learning techniques to determine whether the sensor nodes that are being monitored are looking at the same scene and are therefore likely in the same room. Similar benefits can be achieved by using periodic illumination and photodetectors. By strobing the illumination and detecting using the photodetectors, the presence of an optical path can be detected, likely indicating the absence of opaque walls between the strobe and the detector. In other embodiments, magnetic sensors can be integrated into the sensor nodes and used as a compass to detect the orientation of the sensor node that is being monitored. This information can then be used along with localization information to determine whether the sensor is on the wall, floor, ceiling, or other location.

In one example, each sensor node may include an image sensor and each perimeter wall of a house includes one or more sensor nodes. A hub analyzes sensor data including image data and optionally orientation data along with localization information to determine absolute locations for each sensor node. The hub can then build a three dimensional image of each room of a building for a user. A floor plan can be generated with locations for walls, windows, doors, etc. Image sensors may capture images indicating a change in reflections that can indicate home integrity issues (e.g., water, leaking roof, etc.).

Figure 10:
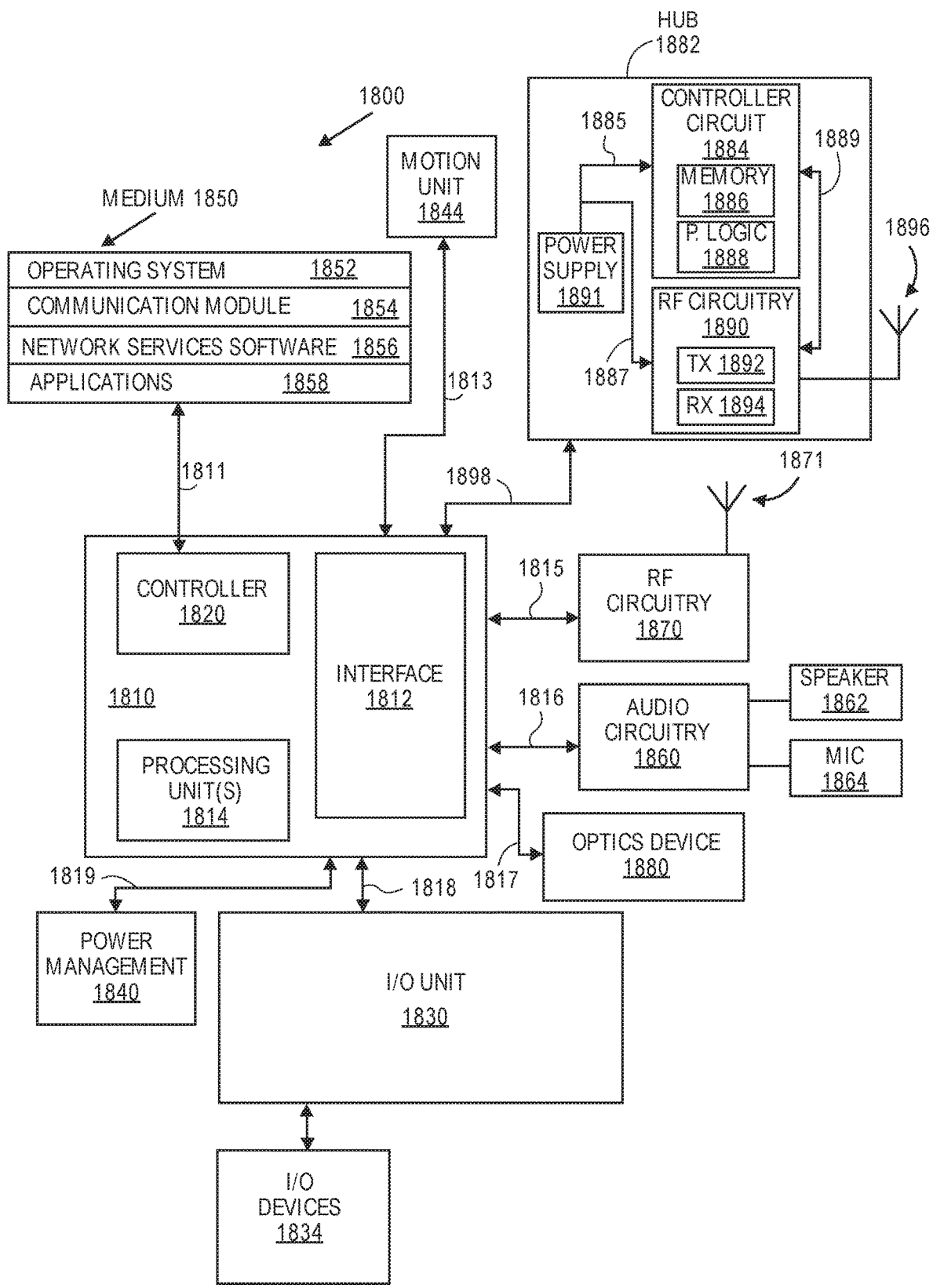
FIG. 10 illustrates a block diagram of a system or appliance 1800 having a hub in accordance with one embodiment.

FIG. 10 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The RF circuitry 1890 includes at least one of LAN RF circuitry, WAN RF circuitry, and cellular RF circuitry. The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

Any of the following examples can be combined into a single embodiment or these examples can be separate embodiments. In one example, an asynchronous system for localization of nodes in a wireless network architecture comprises first and second wireless nodes each having a wireless device with one or more processing units and RF circuitry for transmitting and receiving communications in the wireless network architecture; and a wireless node having an unknown location and a wireless device with a transmitter and a receiver to enable communications with the first and second, wireless nodes in the wireless network architecture. The one or more processing units of the first wireless node are configured to execute instructions to transmit a communication to the second wireless node and the wireless node with the unknown location, to receive a communication with an acknowledgement packet from the wireless node, and to determine time difference of arrival information between the first and second wireless nodes.

In another example, the system includes a third wireless node having a wireless device with one or more processing units and RF circuitry for transmitting and receiving communications in the wireless network architecture. The one or more processing units of the first wireless node are configured to execute instructions for a multilateration algorithm to determine a location of the wireless node with the unknown location using the time difference of arrival information between the first and second wireless nodes and also between the first and third wireless nodes.

In another example, the first wireless node has a first reference clock signal and the second wireless node has a second reference clock signal.

In another example, one or more processing units of the wireless node having an unknown location are configured to execute instructions to transmit communications including acknowledgement packets to the first, second, and third wireless nodes in response to receiving a communication with a forward packet from the first node.

In another example, one or more processing units of the second and third wireless nodes are configured to execute instructions to receive communications including forward packets from the first wireless node and acknowledgement packets from the fourth wireless node, to record a timestamp and channel state information for each of the received forward and acknowledgement packets.

In another example, a transmission time of a forward packet from the first wireless node is used as a time reference for the first, second, and third wireless nodes.

In another example, the time difference of arrival information between the first and second wireless nodes is determined based on a first time when the first wireless node receives the acknowledgement packet from the fourth wireless node, a second time when the second wireless node receives the acknowledgement packet from the fourth wireless node, and the time reference.

In another example, the one or more processing units of the first wireless node are configured to execute instructions to determine a difference between the first time and the time reference and also determine a difference between the second time and the time reference.

In another example, the one or more processing units of the first wireless node are configured to execute instructions to determine the time difference of arrival information based on determining time of flight estimates for localization that is based on time estimates of round trip time of communications between the first and second wireless nodes and communications between the first and third wireless nodes.

In one example, an apparatus comprises a memory for storing instructions, one or more processing units to execute instructions for controlling a plurality of sensor nodes in a wireless network architecture and determining locations of the plurality of sensor nodes and radio frequency (RF) circuitry to transmit communications to and receive communications from the plurality of sensor nodes each having a wireless device with a transmitter and a receiver to enable bi-directional communications with the RF circuitry of the apparatus in the wireless network architecture. The one or more processing units of the apparatus are configured to execute instructions to transmit a communication to first, second, and third wireless nodes, to receive a communication with an acknowledgement packet from the third node that has an unknown location, and to determine time difference of arrival information between the apparatus and the first wireless node and between the apparatus and the second wireless node.

In another example, the one or more processing units of the apparatus are configured to execute instructions for a multilateration algorithm to determine a location of the third wireless node using the time difference of arrival information.

In another example, the apparatus has a first reference clock signal and the first wireless node has a second reference clock signal.

In another example, the transmitted communication includes a transmission time of a forward packet that is transmitted to the first, second, and third wireless nodes with the transmission time being used as a time reference for the apparatus, the first wireless node, and the second wireless node.

In another example, the time difference of arrival information between the apparatus and the first wireless node is determined based on a first time when the apparatus receives an acknowledgement packet from the third wireless node, a second time when the first wireless node receives an acknowledgement packet from the third wireless node, and the time reference.

In another example, the one or more processing units of the apparatus are configured to execute instructions to determine a difference between the first time and the time reference and also determine a difference between the second time and the time reference.

In one example, a system for localization of nodes in a wireless network architecture includes first, second, and third wireless nodes each having a wireless device with one or more processing units and RF circuitry for transmitting and receiving communications in the wireless network architecture and a fourth wireless node having an unknown location and a wireless device with a transmitter and a receiver to enable communications with the first, second, and third wireless nodes in the wireless network architecture. The one or more processing units of the first wireless node are configured to execute instructions to receive a communication with a forward packet from the fourth node, to transmit a communication to the second, third, and fourth wireless nodes in response to the forward packet, and to determine time difference of arrival information between the first and second wireless nodes and between the first and third wireless nodes.

In another example, the one or more processing units of the first wireless node are configured to execute instructions for a multilateration algorithm to determine a location of the fourth wireless node using the time difference of arrival information.

In another example, the first wireless node has a first reference clock signal and the second wireless node has a second reference clock signal.

In another example, one or more processing units of the fourth wireless node are configured to execute instructions to transmit a communication including a forward packet to the first, second, and third wireless nodes.

In another example, one or more processing units of the second and third wireless nodes are configured to execute instructions to receive communications including forward packets from the fourth wireless node and acknowledgement packets from the first wireless node and to record a timestamp and channel state information for each of the received forward and acknowledgement packets.

In another example, the time difference of arrival information between the first and second wireless nodes is determined based on a first time when the first wireless node receives a forward packet from the fourth wireless node, a second time when the second wireless node receives a forward packet from the fourth wireless node, and a time offset between the first and second reference clock signals.

In another example, the one or more processing units of the first wireless node are configured to execute instructions to determine the time offset between the first and second reference clock signals based on a third time when the second wireless node receives an acknowledgement packet from the first wireless node, a fourth time when the first wireless node transmits an acknowledgement packet to the second wireless node, and time of flight estimates for communications between the first and second wireless nodes.

Figure 11:
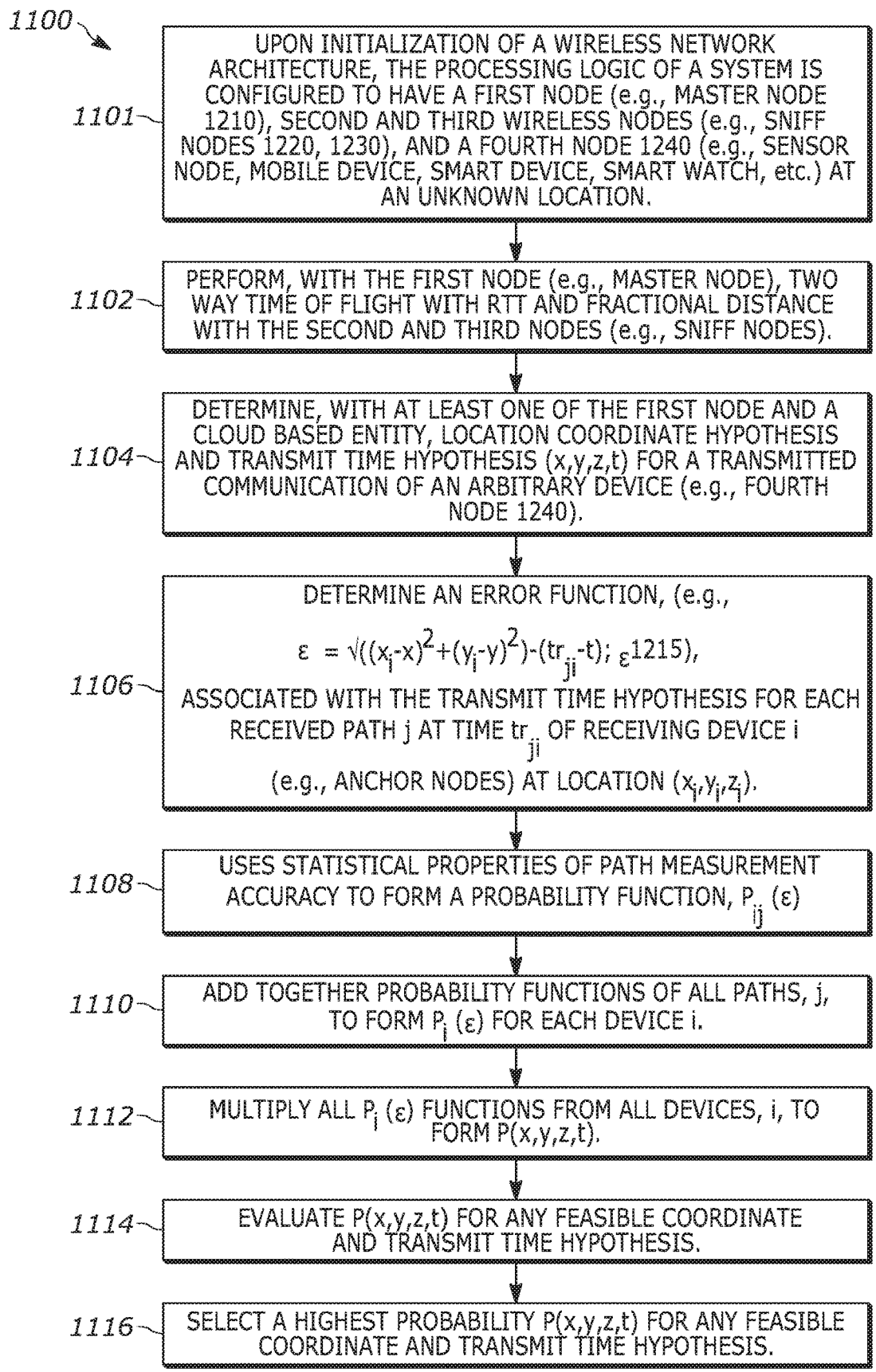
FIG. 11 illustrates a time sweep method for determining location estimation of nodes using time difference of arrival techniques in accordance with one embodiment.

FIG. 11 illustrates a time sweep method for determining location estimation of nodes using time difference of arrival techniques in accordance with one embodiment. The operations of method 1100 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, at least one of a hub and a remote cloud based device or entity performs the operations of method 1100.

Figure 12:
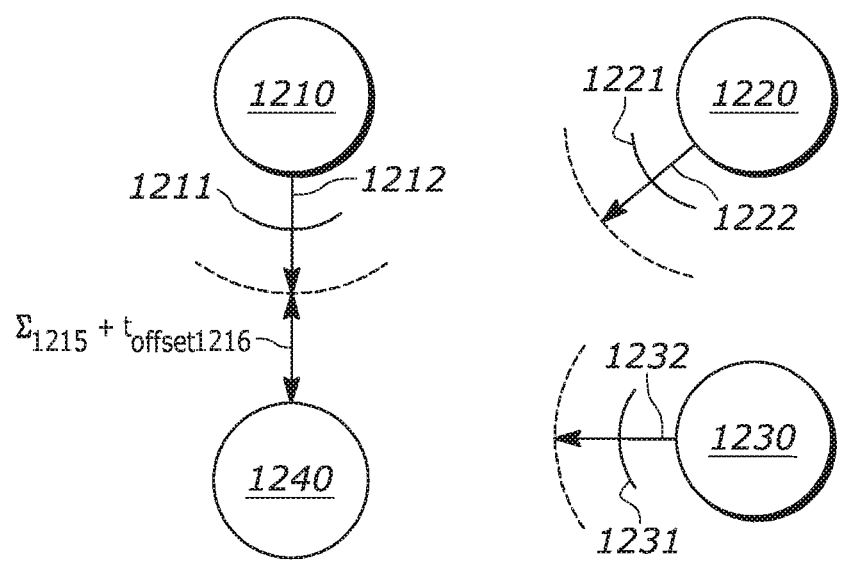
FIG. 12 illustrates a wireless architecture for implementing a time sweep method for determining location estimation of nodes using time difference of arrival techniques in accordance with one embodiment.

Upon initialization of a wireless network architecture (e.g., wireless local area network (LAN), wireless wide area network (WAN), wireless cellular network), at operation 1101 the processing logic of a system is configured to have a first node (e.g., master node 1210), second and third wireless nodes (e.g., sniff nodes 1220, 1230), and a fourth node 1240 (e.g., sensor node, mobile device, smart device, smart watch, etc.) at an unknown location as illustrated in FIG. 12. The first node (e.g., master node) performs two way time of flight with RTT and fractional distance (as described in the U.S. patent application Ser. No. 15/173,531) with of the second and third nodes (e.g., sniff nodes) at operation 1102. The method can determine or obtain location coordinates of the anchor nodes (e.g., first, second, and third nodes 1210, 1220, 1230) based on the time of flight measurements.

At operation 1104, the method determines location coordinate hypothesis and transmit time hypothesis (x,y,z,t) for a transmitted communication of an arbitrary device (e.g., fourth node 1240). Each of the anchor nodes records a detection timestamp and channel state information (CSI) of a received communication. At operation 1106, the method determines an error function, (e.g., epsilon=sqrt(($x_i$-x)^2+ ($y_i$-y)^2)-($tr_{ji}$-t); epsilon 1215), associated with the transmit time hypothesis for each received path j at time $tr_{ji}$ of receiving device i (e.g., anchor nodes) at location ($x_i,y_i,z_i$). At operation 1108, the method uses statistical properties of path measurement accuracy to form a probability function, $P_{ij}$ (epsilon). $P_{ij}$ (eps) can be of any form and examples include normal distribution a(i)*e^(-epsilon^2/b(i)) where a(i) and b(i) can be functions of the path properties.

At operation 1110, the method adds together probability functions of all paths, j, to form $P_i$ (epsilon) for each device i. At operation 1112, the method multiplies all $P_i$ (epsilson) functions from all devices, i, to form P(x,y,z,t). A numerical implementation of multiplication can be also replaced by summing log($P_i$). At operation 1114, the method evaluates P(x,y,z,t) for any feasible coordinate and transmit time hypothesis. At operation 1116, the method selects a highest probability P(x,y,z,t) for any feasible coordinate and transmit time hypothesis.

In one example, this system is set up utilizing the master node as an access point (AP) and having the unknown fourth node associated with it or by other means. The sniff nodes are configured to receive any packets sent by the master node or unknown fourth node. Each of the sniff nodes records a detection timestamp and channel state information (CSI) of a received communication. The sniff nodes and the master node all record a timestamp and CSI of the received communications.

FIG. 12 illustrates a wireless architecture for time sweep TDoA in accordance with one embodiment. The anchor nodes 1210, 1220, 1230 each transmit and receive communications from a node 1240 having an unknown location. Anchor nodes receive communications from the node 1240 along paths 1212, 1222, and 1232 with multipaths j being indicated by the radii 1211, 1221, and 1231 for each node. The multipaths can be caused by reflections of communications within an environment (e.g., indoor environment, building, room). Each node has an error function (e.g., epsilon 1215) that represents a difference between the predicted coordinate and the actual location of the node 1240. Each anchor node also has a time offset (e.g., time offset 1216) that is based on a difference between an actual transmit time of a transmission from the node 1240 and a transmit time hypothesis of the node 1240.

For a prior approach, a beam forming method locates a device based on measuring a transmitter response of the device. Calculations are performed in time domain. However, it is difficult to estimate distance to an arbitrary device since its transmitter response is not known and converting channel state information (CSI) into time domain can create artifacts.

The present design utilizes existing powerful beamforming algorithms (for steering vector finding) to overcome existing TDoA problems. Estimate for the transmitter response of an arbitrary device can be added together coherently in frequency domain assuming any location hypothesis.

Figure 13:
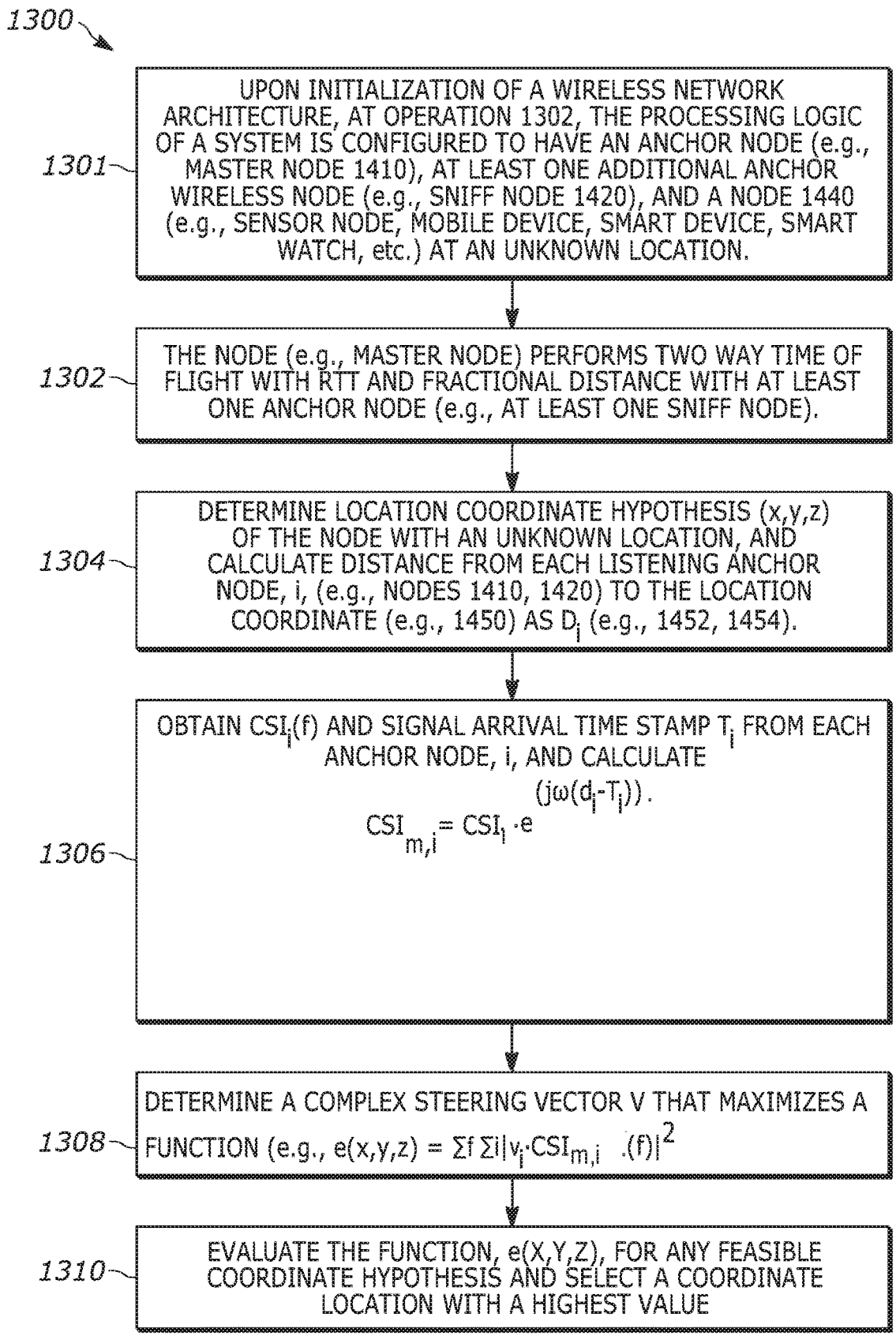
FIG. 13 illustrates a beam forming method in frequency domain for determining location estimation of nodes in accordance with one embodiment.

FIG. 13 illustrates a beam forming method in frequency domain for determining location estimation of nodes in accordance with one embodiment. The operations of method 1300 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, at least one of a hub, anchor node, and a remote cloud based device or entity performs the operations of method 1300.

Figure 14:
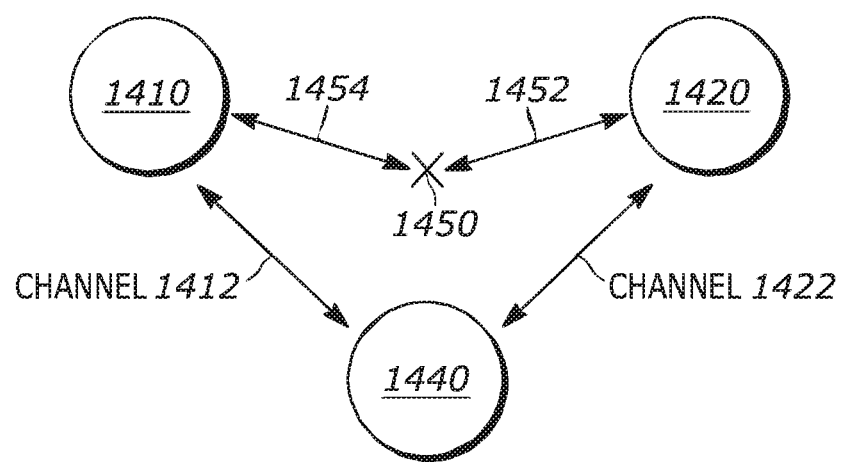
FIG. 14 illustrates a wireless architecture for implementing beam forming methods for determining location estimation of nodes in accordance with one embodiment.

Upon initialization of a wireless network architecture (e.g., wireless local area network (LAN), wireless wide area network (WAN), wireless cellular network), at operation 1301, the processing logic of a system is configured to have an anchor node (e.g., master node 1410), at least one additional anchor wireless node (e.g., sniff node 1420), and a node 1440 (e.g., sensor node, mobile device, smart device, smart watch, etc.) at an unknown location as illustrated in FIG. 14. The node (e.g., master node) performs two way time of flight with RTT and fractional distance (as described in the U.S. patent application Ser. No. 15/173,531) with at least one anchor node (e.g., at least one sniff node) at operation 1302. Each of the anchor nodes records a detection timestamp and channel state information (CSI) from channels 1412 and 1422 of a received communication.

At operation 1304, the method determines location coordinate hypothesis (x,y,z) of the node with an unknown location, and calculates distance from each listening anchor node, i, (e.g., nodes 1410, 1420) having an operable receiver to the location coordinate (e.g., 1450) as d, (e.g., 1452, 1454).

At operation 1306, the method obtains $CSI_i(f)$ and signal arrival time stamp $T_i$ from each anchor node, i, and calculates modified CSI: $CSI_{m,i} = CSI_i \cdot e^{\wedge}(j\omega(d_i - T_i))$ by adding a time shift di-Ti into the original CSI. By doing this time shift the combined CSIs will have high energy in the correct location hypothesis. Anchor clock phase differences must be measured and included in the time stamp if the anchors are not synchronized. Only relative time stamp value is needed so a constant can be subtracted from all time stamps to keep them as small values as possible. Small time stamp values may increase the accuracy of the following operations.

At operation 1308, the method determines a complex steering vector v that maximizes $e(x,y,z) = \Sigma f \Sigma i | v_i \cdot CSI_{m,i}(f) |^{\wedge}2$ At operation 1310, the method evaluates e(x,y,z) for any feasible coordinate hypothesis and selects a coordinate location with a highest value.

Given that each listening anchor node calculates an estimate for the transmitter response of an arbitrary device then all estimates can be added together coherently in frequency domain assuming any location hypothesis. The sum will have the highest value when the hypothesis corresponds to an actual location of the arbitrary device.

Figure 15:
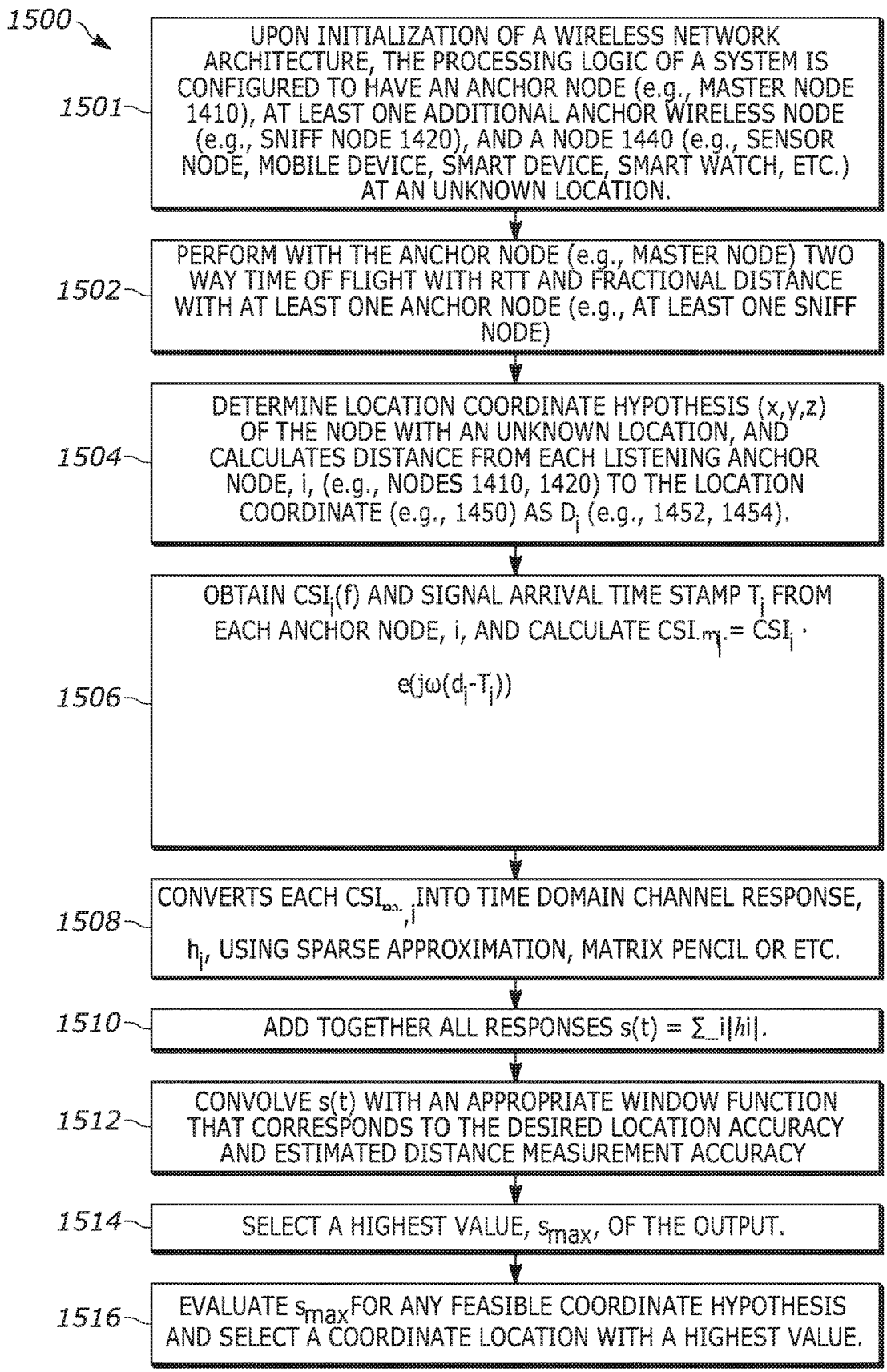
FIG. 15 illustrates a beam forming method in time domain for determining location estimation of nodes in accordance with one embodiment.

FIG. 15 illustrates a beam forming method in time domain for determining location estimation of nodes in accordance with one embodiment. The operations of method 1500 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, at least one of a hub, anchor node, and a remote cloud based device or entity performs the operations of method 1500.

Upon initialization of a wireless network architecture (e.g., wireless local area network (LAN), wireless wide area network (WAN), wireless cellular network), at operation 1502, the processing logic of a system is configured to have an anchor node (e.g., master node 1410), at least one additional anchor wireless node (e.g., sniff node 1420), and a node 1440 (e.g., sensor node, mobile device, smart device, smart watch, etc.) at an unknown location as illustrated in FIG. 14. The anchor node (e.g., master node) performs two way time of flight with RTT and fractional distance (as described in the U.S. patent application Ser. No. 15/173,531) with at least one anchor node (e.g., at least one sniff node) at operation 1502. Each of the anchor nodes records a detection timestamp and channel state information (CSI) from channels 1412 and 1422 of a received communication.

At operation 1504, the method determines location coordinate hypothesis (x,y,z) of the node with an unknown location, and calculates distance from each listening anchor node, i, (e.g., nodes 1410, 1420) to the location coordinate hypothesis as $d_i$ (e.g., 1452, 1454).

At operation 1506, the method obtains channel state information (e.g., $CSI_i(f)$) and signal arrival time stamp $T_i$ from each anchor node, i, and calculates modified CSI
$CSI_{m,i} = CSI_i \cdot e^{\wedge}(j\omega(d_i - T_i))$ by adding a time shift into the original CSI. Alternatively, CSI could be multiplied with Fourier Transform of a window function in operation 1506. The window function, described below, can be used to reduce noise and spurious elements created by the conversion from frequency domain to time domain.

At operation 1508, the method converts each $CSI_{m,i}$ into time domain channel response, NO, using Sparse Approximation, Matrix Pencil or etc. At operation 1510, the method adds together magnitude of all responses $s(t) = \Sigma\_i | h_i |$.

At operation 1512, the method filters out spurious components for example by convolving s(t) with an appropriate window function that corresponds to the desired location accuracy and estimated distance measurement accuracy. Some conversion methods in operation 1508 can create spurious elements into the time domain channel response. Sometimes these spurious components may have amplitude close to the actual delay path components. If the conversion has higher resolution than required for the location accuracy, then spurious components can be attenuated by a window function. The window function can be a simple average over several time samples, more complex shape that is better fitted to a specific conversion method or the convolution step can be completely omitted. At operation 1514, the method selects a highest value, $s_{max}$, of the output.

At operation 1516, the method evaluates $s_{max}$ for any feasible coordinate hypothesis and selects a coordinate location with a highest value.

A prior beam forming approach includes having a device being located based on measuring a transmitter response of the device. However, it is difficult to estimate distance to an arbitrary device since its transmitter response is not known. Adding frequency domain responses coherently together requires estimating each anchor nodes phase which may cause errors.

The method 1500 of FIG. 15 performs a conversion from frequency domain into time domain to remove an unknown phase of the anchor nodes. If each listening anchor node calculates an estimate for the transmitter time response amplitudes of the arbitrary device then all the estimates can be added together for any location hypothesis. The sum will have the highest amplitude peak value when the hypothesis corresponds to the actual location of the arbitrary device.

Any of the following examples can be combined into a single embodiment or these examples can be separate embodiments. In one example of a first embodiment, a computer implemented method for localization of a wireless arbitrary device in a wireless network architecture, comprises initializing a wireless network architecture having a plurality of wireless anchor nodes; determining, with at least one of an anchor node and a cloud based entity, a location coordinate hypothesis and a transmit time hypothesis for a transmitted communication of the wireless arbitrary device; determining an error function associated with the transmit time hypothesis for each received path j of the receiving plurality of anchor nodes at the location coordinate hypothesis; and determining a probability function of the error function for each received path j of each anchor node using statistical properties of path measurement accuracy.

In another example of the first embodiment, the computer implemented method further comprises adding probability functions of all paths, j, to form a probability function of the error function for each of the plurality of anchor nodes.

In another example of the first embodiment, the computer implemented method further comprises multiplying the probability function of the error function for each of the plurality of anchor nodes to form a probability function P(x,y,z,t) of the coordinate location in three dimensions and the transmit time hypothesis for the wireless arbitrary device.

In another example of the first embodiment, the computer implemented method further comprises evaluating the probability function of the coordinate location in three dimensions and the transmit time hypothesis for any feasible coordinate and transmit time hypothesis; and selecting at least one hypothesis from the highest probabilities P(x,y,z,t) for any feasible coordinate and transmit time hypothesis.

In another example of the first embodiment, the computer implemented method further comprises evaluating the probability function of the coordinate location in three dimensions and the transmit time hypothesis for any feasible transmit time hypothesis; and summing together values of P(x,y,z,t) over at least one predefined range of x, y and z; and determining in which range an arbitrary device most likely locates by selecting the range with the highest sum.

In another example of the first embodiment, the computer implemented method further comprises summing together values of P(x,y,z,t) over a range of x, y and z around the selected highest probability so that the sum equals predetermined value; and using the size of the range as indication of the location accuracy.

In another example of the first embodiment, the error function comprises $sqrt((x_i-x)^2+(y_i-y)^2)-(tr_{ji}-t)$ associated with the transmit time hypothesis for each received path j at time $tr_{ji}$ of receiving anchor nodes at location $(x_i,y_i,z_i)$.

In one example of a second embodiment, an asynchronous system for localization of nodes in a wireless network architecture, comprises first and second wireless nodes each having a wireless device with one or more processing units and RF circuitry for transmitting and receiving communications in the wireless network architecture; and a third wireless node having an unknown location and a wireless device with a transmitter and a receiver to enable communications with the first and second, wireless nodes in the wireless network architecture, wherein the one or more processing units of the first wireless node are configured to transmit instructions to a cloud based entity or execute instructions to determine a location coordinate hypothesis and a transmit time hypothesis for a transmitted communication of the third wireless node, determine an error function associated with the transmit time hypothesis for each received path j of the receiving first and second wireless nodes at the location coordinate hypothesis, and determine a probability function of the error function for each received path j of the first and second wireless nodes using statistical properties of path measurement accuracy.

In another example of the second embodiment, the one or more processing units of the first wireless node or the cloud based entity to execute instructions to add probability functions of all paths, j, to form a probability function of the error function for the first and second wireless nodes.

In another example of the second embodiment, the one or more processing units of the first wireless node or the cloud based entity are configured to execute instructions to multiply the probability function of the error function for the first and second wireless nodes to form a probability function P(x,y,z,t) of the coordinate location in three dimensions and the transmit time hypothesis for the third wireless node.

In another example of the second embodiment, the one or more processing units of the first wireless node or the cloud based entity are configured to execute instructions to evaluate the probability function of the coordinate location in three dimensions and the transmit time hypothesis for any feasible coordinate and transmit time hypothesis and select a highest probability P(x,y,z,t) for any feasible coordinate and transmit time hypothesis.

In another example of the second embodiment, the first wireless node has a first reference clock signal, the second wireless node has a second reference clock signal, and the third wireless node has a third reference clock signal.

In another example of the second embodiment, the wireless network architecture comprises a wireless WAN architecture.

In another example of the second embodiment, the wireless network architecture comprises at least one of a wireless local area network (LAN) network architecture and a wireless WAN architecture.

In another example of the second embodiment, the first wireless node includes a wireless wide area network (WAN) RF circuitry for transmitting and receiving wireless RF communications.

In one example of a third embodiment, a computer implemented method for localization of a wireless arbitrary device in a wireless network architecture, comprises initializing a wireless network architecture having a plurality of wireless anchor nodes i; determining location coordinate hypothesis in three dimensions for the wireless arbitrary device having an unknown location; calculating distance $d_i$ from each listening wireless anchor node i to the location coordinate hypothesis; and obtaining channel state information from each wireless anchor node i and signal arrival time stamp $T_i$ from each wireless anchor node i.

In another example of the third embodiment, a computer implemented method further comprises calculating a modified channel state information based on the original channel state information, distance $d_i$ and signal arrival time stamp $T_i$ from each anchor node i.

In another example of the third embodiment, a computer implemented method further comprises determining a complex steering vector v that maximizes a function having variables of the location coordinate hypothesis, wherein the function is based on the steering vector and the modified channel state information.

In another example of the third embodiment, a computer implemented method further comprises evaluating the function for any feasible coordinate hypothesis and selecting a coordinate location with a highest value.

In one example of an fourth embodiment, an asynchronous system for localization of nodes in a wireless network architecture comprises first and second wireless nodes each having a wireless device with one or more processing units and RF circuitry for transmitting and receiving communications in the wireless network architecture; and a third wireless node having an unknown location and a wireless device with a transmitter and a receiver to enable communications with the first and second, wireless nodes in the wireless network architecture, wherein the one or more processing units of the first wireless node are configured to transmit instructions to a cloud based entity or execute instructions to determine location coordinate hypothesis in three dimensions for the third wireless node device having an unknown location, calculate distance from the first and second wireless nodes to the location coordinate hypothesis, and obtain channel state information from the first and second wireless nodes and signal arrival time stamp T from the first and second wireless nodes.

In another example of the fourth embodiment, the one or more processing units of the first wireless node or the cloud based entity to execute instructions to calculate a transmitter response of the third wireless device based on the channel state information, calculated distances, signal arrival time stamp $T_i$ from the first and second wireless nodes, and a known receive response for the first and second wireless nodes.

In another example of the fourth embodiment, the one or more processing units of the first wireless node or the cloud based entity are configured to execute instructions to determine a complex steering vector v that maximizes a function having variables of the location coordinate hypothesis, wherein the function is based on the steering vector and the calculated transmitter response of the third wireless node.

In another example of the fourth embodiment, the one or more processing units of the first wireless node or the cloud based entity are configured to execute instructions to evaluate the function for any feasible coordinate hypothesis and select a coordinate location with a highest value.

In another example of the fourth embodiment, the first wireless node has a first reference clock signal, the second wireless node has a second reference clock signal, and the third wireless node has a third reference clock signal; and where the first and second reference clock phase difference is removed before using the signal arrival time stamps.

In one example of a fifth embodiment, a computer implemented method for localization of a wireless node in a wireless network architecture, comprises initializing a wireless network architecture having a plurality of wireless anchor nodes i; determining, with at least one of an anchor node and a cloud based entity, a location coordinate hypothesis of the wireless node having an unknown location; calculating distance from each anchor node i to the location coordinate hypothesis; and obtaining channel state information and signal arrival time stamp $T_i$ from each anchor node i.

In another example of the fifth embodiment, the computer implemented method further comprises calculating a modified channel state information based on the original channel state information, distance $d_i$ and signal arrival time stamp $T_i$ from each anchor node i.

In another example of the fifth embodiment, the computer implemented method further comprises calculating a modified channel state information based on the original channel state information, distance $d_i$, signal arrival time stamp $T_i$ from each anchor node i.

In another example of the fifth embodiment, the computer implemented method further comprises converting each modified channel state information of the wireless for each anchor node into a time domain channel response, $h_i(t)$; and adding together all time domain response amplitudes, abs ($h_i$), in a time domain to generate a sum of the transmitter responses, s(t).

In another example of the fifth embodiment, the computer implemented method further comprises convolving s(t) with an appropriate window function to generate an output, the window function corresponds to a desired location accuracy and estimated distance measurement accuracy.

In another example of the fifth embodiment, the computer implemented method further comprises selecting a highest value, $s_{max}$, of the output.

In another example of the fifth embodiment, the computer implemented method further comprises evaluating $s_{max}$ for any feasible coordinate hypothesis and selecting a coordinate location with a highest value.

In another example of the fifth embodiment, the wireless network architecture comprises a wireless WAN architecture.

In another example of the fifth embodiment, the wireless network architecture comprises at least one of a wireless local area network (LAN) network architecture and a wireless WAN architecture.

The phrase "at least one of A and B" should be understood to mean "only A, only B, or both A and B." The phrase "at least one selected from the group of A and B" should be understood to mean "only A, only B, or both A and B." The phrase "at least one of A, B, or C" should be understood to mean "only A, only B, only C, or any combination of A, B, or C."

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive state.

What is claimed is:

1. A computer implemented method for localization of a wireless arbitrary device in a wireless network architecture, comprising:
    initializing a wireless network architecture having a plurality of wireless anchor nodes;
    determining, with at least one of a wireless anchor node and a cloud based entity, a location coordinate hypothesis and a transmit time hypothesis for a transmit time of a transmitted communication of the wireless arbitrary device;
    determining an error function that is based on the location coordinate hypothesis and actual location coordinate for the wireless arbitrary device in at least two dimensions and the transmit time hypothesis for each received path j of the plurality of wireless anchor nodes; and
    determining a probability function of the error function for each received path j of each wireless anchor node using statistical properties of path measurement accuracy.

2. The computer implemented method of claim 1, further comprising:
    adding probability functions of all paths, j, to form a probability function of the error function for each of the plurality of wireless anchor nodes.

3. The computer implemented method of claim 2, further comprising:
    multiplying the probability function of the error function for each of the plurality of wireless anchor nodes to form a probability function P(x,y,z,t) of the coordinate location in three dimensions and the transmit time hypothesis for the wireless arbitrary device.

4. The computer implemented method of claim 3, further comprising:
    evaluating the probability function of the coordinate location in three dimensions and the transmit time hypothesis for any feasible coordinate and transmit time hypothesis; and
    selecting at least one hypothesis from the highest probabilities P(x,y,z,t) for any feasible coordinate and transmit time hypothesis.

5. The computer implemented method of claim 3, further comprising:
    evaluating the probability function of the coordinate location in three dimensions and the transmit time hypothesis for any feasible transmit time hypothesis; and
    summing together values of P(x,y,z,t) over at least one predefined range of x,y and z; and determining in which range an arbitrary device most likely locates by selecting the range with the highest sum.

6. The computer implemented method of claim 4, further comprising:
summing together values of P(x,y,z,t) over a range of x,y and z around the selected highest probability so that the sum equals a predetermined value; and
using the size of the range as indication of the location accuracy.

7. The computer implemented method of claim 1, wherein the error function comprises sqrt((xi–x)^2+(yi–y)^2)–(trji–t) associated with the transmit time hypothesis for each received path j at time trji of receiving wireless anchor nodes at location (xi,yi,zi).

8. An asynchronous system for localization of nodes in a wireless network architecture, comprising:
first and second wireless nodes each having a wireless device with one or more processing units and RF circuitry for transmitting and receiving communications in the wireless network architecture; and
a third wireless node having an unknown location and a wireless device with a transmitter and a receiver to enable communications with the first and second wireless nodes in the wireless network architecture, wherein the one or more processing units of the first wireless node are configured to transmit instructions to a cloud based entity or execute instructions to determine a location coordinate hypothesis and a transmit time hypothesis for a transmit time of a transmitted communication of the third wireless node, determine an error function that is based on the location coordinate hypothesis and actual location coordinate for the wireless arbitrary device in at least two dimensions and the transmit time hypothesis for each received path j of the receiving first and second wireless nodes, and determine a probability function of the error function for each received path j of the first and second wireless nodes using statistical properties of path measurement accuracy.

9. The asynchronous system of claim 8, wherein the one or more processing units of the first wireless node or the cloud based entity to execute instructions to add probability functions of all paths, j, to form a probability function of the error function for the first and second wireless nodes.

10. The asynchronous system of claim 9, wherein the one or more processing units of the first wireless node or the cloud based entity are configured to execute instructions to multiply the probability function of the error function for the first and second wireless nodes to form a probability function P(x,y,z,t) of the coordinate location in three dimensions and the transmit time hypothesis for the third wireless node.

11. The asynchronous system of claim 10, wherein the one or more processing units of the first wireless node or the cloud based entity are configured to execute instructions to evaluate the probability function of the coordinate location in three dimensions and the transmit time hypothesis for any feasible coordinate and transmit time hypothesis and
select a highest probability P(x,y,z,t) for any feasible coordinate and transmit time hypothesis.

12. The asynchronous system of claim 8, wherein the first wireless node has a first reference clock signal, the second wireless node has a second reference clock signal, and the third wireless node has a third reference clock signal.

13. The asynchronous system of claim 8, wherein the wireless network architecture comprises a wireless wide area network (WAN) architecture.

14. The asynchronous system of claim 8, wherein the wireless network architecture comprises at least one of a wireless local area network (LAN) network architecture and a wireless wide area network (WAN) architecture.

15. The asynchronous system of claim 8, wherein the first wireless node includes a wireless wide area network (WAN) RF circuitry for transmitting and receiving wireless RF communications.

16. A computer implemented method for localization of a wireless arbitrary device in a wireless network architecture, comprising:
initializing a wireless network architecture having a plurality of wireless anchor nodes i;
determining location coordinate hypothesis in three dimensions for the wireless arbitrary device having an unknown location;
calculating distance di from each listening wireless anchor node i to the location coordinate hypothesis;
obtaining channel state information in frequency domain from each wireless anchor node i and signal arrival time stamp Ti for a communication transmitted from the wireless arbitrary device to each wireless anchor node i; and
calculating a modified channel state information in frequency domain by adding a time shift into the original channel state information from each wireless anchor node i.

17. The computer implemented method of claim 16, further comprising: calculating a modified channel state information based on the original channel state information, distance di and signal arrival time stamp Ti from each wireless anchor node i.

18. The computer implemented method of claim 16, further comprising:
determining a complex steering vector v that maximizes a function having variables of the location coordinate hypothesis, wherein the function is based on the steering vector and the modified channel state information.

19. The computer implemented method of claim 16, further comprising:
evaluating the function for any feasible coordinate hypothesis and selecting a coordinate location with a highest value.

20. An asynchronous system for localization of nodes in a wireless network architecture, comprising:
first and second wireless nodes each having a wireless device with one or more processing units and RF circuitry for transmitting and receiving communications in the wireless network architecture; and
a third wireless node having an unknown location and a wireless device with a transmitter and a receiver to enable communications including transmitting a communication to the first and second wireless nodes in the wireless network architecture, wherein the one or more processing units of the first wireless node are configured to transmit instructions to a cloud based entity or execute instructions to determine location coordinate hypothesis in three dimensions for the third wireless node having an unknown location, calculate distance from the first and second wireless nodes to the location coordinate hypothesis, obtain channel state information from the first and second wireless nodes and signal arrival time stamp T from the first and second wireless nodes; and calculate a transmitter response of the third wireless node when transmitting the communication based on the channel state information and calculated distances from the first and second wireless nodes to the location coordinate hypothesis.

21. The asynchronous system of claim 20, wherein the one or more processing units of the first wireless node or the cloud based entity to execute instructions to calculate a transmitter response of the third wireless node when transmitting the communication based on the channel state information, calculated distances, signal arrival time stamp Ti from the first and second wireless nodes, and a known receive response for the first and second wireless nodes.

22. The asynchronous system of claim 20, wherein the one or more processing units of the first wireless node or the cloud based entity are configured to execute instructions to determine a complex steering vector v that maximizes a function having variables of the location coordinate hypothesis, wherein the function is based on the steering vector and the calculated transmitter response of the third wireless node.

23. The asynchronous system of claim 20, wherein the one or more processing units of the first wireless node or the cloud based entity are configured to execute instructions to evaluate the function for any feasible coordinate hypothesis and select a coordinate location with a highest value.

24. The asynchronous system of claim 20, wherein the first wireless node has a first reference clock signal, the second wireless node has a second reference clock signal, and the third wireless node has a third reference clock signal; and where the first and second reference clock phase difference is removed before using the signal arrival time stamps.

25. A computer implemented method for localization of a wireless node in a wireless network architecture, comprising:
  initializing a wireless network architecture having a plurality of wireless anchor nodes i;
  determining, with at least one of a wireless anchor node and a cloud based entity, a location coordinate hypothesis of the wireless node having an unknown location;
  calculating distance from each wireless anchor node i to the location coordinate hypothesis; and
  obtaining channel state information in frequency domain and signal arrival time stamp Ti from each wireless anchor node I for a communication transmitted from the wireless node to each wireless anchor node i; and
  calculating a modified channel state information in frequency domain by adding a time shift into the original channel state information from each wireless anchor node i.

26. The computer implemented method of claim 25, further comprising:
  calculating a modified channel state information based on the original channel state information, distance di, signal arrival time stamp Ti from each wireless anchor node i.

27. The computer implemented method of claim 25, further comprising:
  converting each modified channel state information for each wireless anchor node into a time domain channel response, hi(t); and
  adding together all time domain response amplitudes, $\Sigma\_i |hi|$, in a time domain to generate a sum of the transmitter responses, s(t).

28. The computer implemented method of claim 27, further comprising:
  convolving s(t) with an appropriate window function to generate an output, the window function corresponds to a desired location accuracy and estimated distance measurement accuracy.

29. The computer implemented method of claim 28, further comprising:
  selecting a highest value, smax, of the output.

30. The computer implemented method of claim 29, further comprising:
  evaluating smax for any feasible coordinate hypothesis and selecting a coordinate location with a highest value.

31. The computer implemented method of claim 25, wherein the wireless network architecture comprises a wireless wide area network (WAN) architecture.

32. The computer implemented method of claim 25, wherein the wireless network architecture comprises at least one of a wireless local area network (LAN) network architecture and a wireless wide area network (WAN) architecture.

* * * * *